(12) United States Patent
Abe et al.

(10) Patent No.: US 7,931,297 B2
(45) Date of Patent: Apr. 26, 2011

(54) AIRBAG AND AIRBAG DEVICE

(75) Inventors: Kazuhiro Abe, Tokyo (JP); Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 15 days.

(21) Appl. No.: 12/449,009

(22) PCT Filed: Nov. 19, 2007

(86) PCT No.: PCT/JP2007/072349
§ 371 (c)(1),
(2), (4) Date: Jul. 20, 2009

(87) PCT Pub. No.: WO2008/102491
PCT Pub. Date: Aug. 28, 2008

(65) Prior Publication Data
US 2010/0001498 A1    Jan. 7, 2010

(30) Foreign Application Priority Data

Feb. 19, 2007   (JP) ................................ 2007-038072

(51) Int. Cl.
*B60R 21/16* (2006.01)
(52) U.S. Cl. ................... 280/739; 280/743.1; 280/743.2
(58) Field of Classification Search .................. 280/739, 280/743.2, 738, 743.1
See application file for complete search history.

(56) References Cited

U.S. PATENT DOCUMENTS

| | | | | |
|---|---|---|---|---|
| 6,224,101 B1 * | 5/2001 | Nishijima et al. | ......... | 280/743.2 |
| 6,471,244 B1 * | 10/2002 | Nishijima et al. | ............ | 280/742 |
| 6,648,371 B2 * | 11/2003 | Vendely et al. | ................ | 280/739 |
| 6,773,030 B2 * | 8/2004 | Fischer | .......................... | 280/739 |
| 6,832,778 B2 * | 12/2004 | Pinsenschaum et al. | ..... | 280/739 |
| 6,918,611 B1 * | 7/2005 | Winters et al. | ................. | 280/735 |
| 7,195,279 B2 * | 3/2007 | Rose et al. | ..................... | 280/740 |
| 7,651,130 B2 * | 1/2010 | Bauberger | ................. | 280/743.2 |
| 7,686,327 B2 * | 3/2010 | Heuschmid et al. | .......... | 280/729 |
| 7,712,769 B2 * | 5/2010 | Hasebe et al. | ................. | 280/729 |
| 2005/0098990 A1 * | 5/2005 | Pinsenschaum et al. | ..... | 280/739 |
| 2005/0248137 A1 | 11/2005 | Delventhal et al. | | |
| 2006/0071462 A1 | 4/2006 | Smith et al. | | |

(Continued)

FOREIGN PATENT DOCUMENTS

FR    2 757 465    6/1998

(Continued)

*Primary Examiner* — Toan C To
(74) *Attorney, Agent, or Firm* — Foley & Lardner LLP

(57) ABSTRACT

An airbag and an airbag device are provided in which an openable-closable vent hole opens or significantly opens even if an object, such as a child seat, comes into contact with a lower portion of the airbag in an inflated state. A covering member (20) covers an openable-closable vent hole (11) from the outside of an airbag (10). An upper tether (30) routed through an upper constantly open vent hole (12) and in the inside of the airbag (10) connects the covering member and a near-passenger face (10*f*) of the airbag (10). A lower tether (31) routed through a lower constantly open vent hole (13) and in the inside of the airbag (10) connects the covering member and a lower portion (10*b*) of the airbag (10). When a passenger comes into contact with the near-passenger face (10*f*) of the airbag (10), the upper tether (30) loosens and the covering member (20) is turned up, whereby the openable-closable vent hole (11) opens. When a child seat (6) comes into contact with the lower portion (10*b*) of the airbag (10), the lower tether (31) loosens and the covering member (20) is turned up, whereby the openable-closable vent hole (11) opens.

8 Claims, 22 Drawing Sheets

U.S. PATENT DOCUMENTS

2006/0151979 A1 7/2006 DePottey et al.

FOREIGN PATENT DOCUMENTS

| | | |
|---|---|---|
| GB | 2 425 991 | 11/2006 |
| JP | 5-85295 | 4/1993 |
| JP | 6-127330 | 5/1994 |
| JP | 8-1156 | 1/1996 |
| JP | 9-142239 | 6/1997 |
| JP | 2000-142307 | 5/2000 |
| JP | 2001-301555 | 10/2001 |
| JP | 2004-161257 | 6/2004 |
| JP | 2005-14861 | 1/2005 |
| WO | WO 2004/009404 | 1/2004 |
| WO | WO 2006/041547 | 4/2006 |
| WO | WO 2006/041552 | 4/2006 |
| WO | WO 2006/073534 | 7/2006 |

* cited by examiner

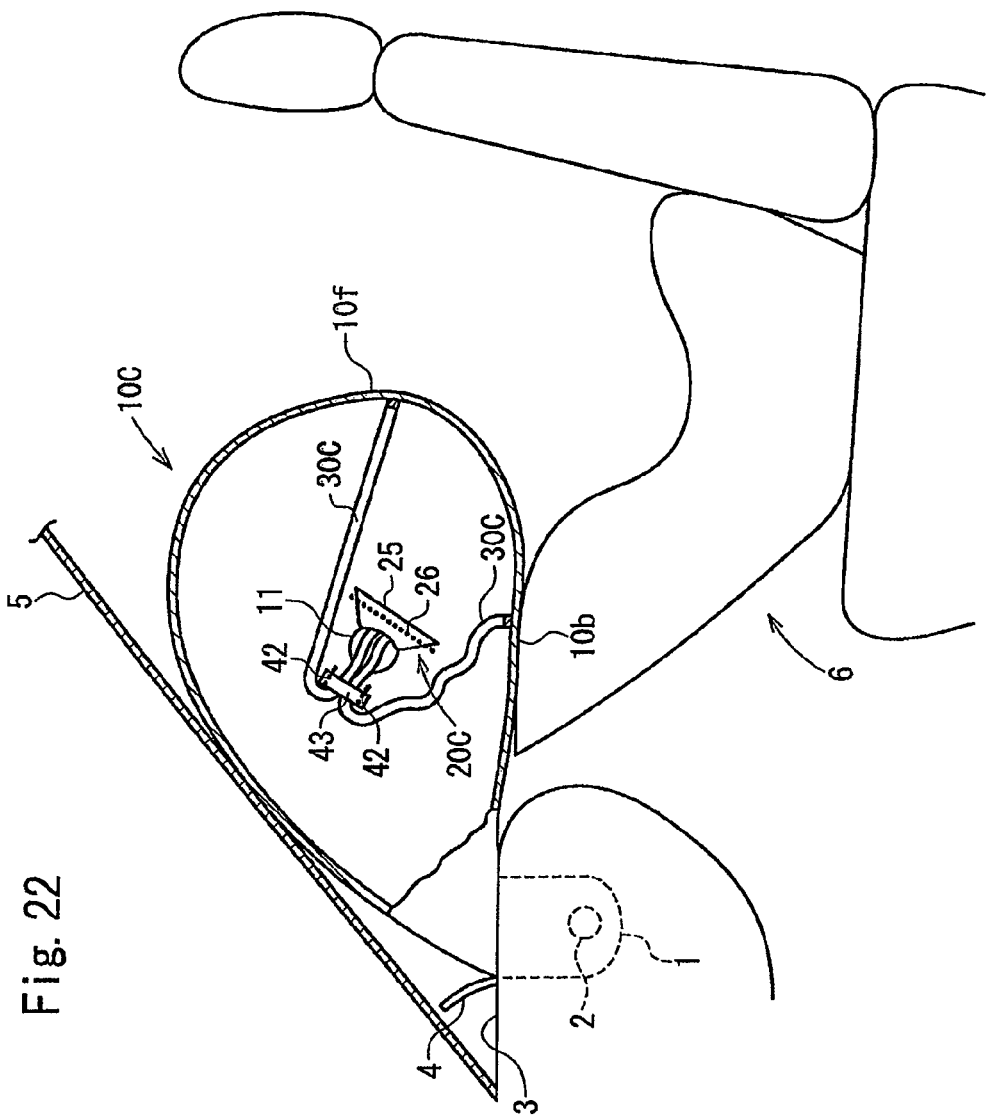

AIRBAG AND AIRBAG DEVICE

TECHNICAL FIELD

The present invention relates to an airbag including a vent hole through which gas is discharged from the inside to the outside of the airbag, whereby shock is absorbed, and a covering member that covers the vent hole. The present invention also relates to an airbag device including the foregoing airbag.

BACKGROUND ART

It is widely known that an airbag is provided with a vent hole, through which gas inside the airbag is discharged when a vehicle occupant or the like bumps into the airbag in an inflated state, whereby the vehicle occupant or the like is softly received by the airbag.

Japanese Unexamined Patent Application Publication No. 6-127330 discloses an airbag in which a vent hole is closed before an occupant comes into contact with a near-occupant face of the airbag in an inflated state, but the vent hole opens when the occupant comes into contact with the near-occupant face of the inflated airbag and causes the near-occupant face to retract.

The foregoing publication describes that the vent hole is provided in an away-from-occupant face of the airbag, opposite the near-occupant face, and a slit is provided near the vent hole. A strap is made to pass through the slit. One end of the strap is routed in the inside of the airbag and is connected to the near-occupant face of the airbag. The other end of the strap is routed to pass through the slit and to extend along the outer surface of the airbag across the vent hole, and is connected to the outer surface of the airbag on a side across the vent hole from the slit.

According to the publication, when the airbag is inflated, the near-occupant face and the away-from-occupant face of the airbag move away from each other, causing the strap to be under tension. In this state, the other end of the strap is under tension along the outer surface of the airbag and overlies the vent hole, thereby closing the vent hole. Thus, the discharge of the gas through the vent hole is regulated, the pressure inside the airbag quickly increases, and the airbag is quickly deployed.

When the occupant comes into contact with the near-occupant face of the inflated airbag and causes the near-occupant face to retract inward of the airbag, the strap loosens and the other end of the strap moves away from the vent hole because of the gas pressure inside the airbag. Thus, the vent hole opens and the gas is discharged through the vent hole to the outside of the airbag. Consequently, the occupant is softly received by the airbag.

[Patent Document 1] Japanese Unexamined Patent Application Publication No. 6-127330

According to Japanese Unexamined Patent Application Publication No. 6-127330, if the airbag is inflated with a child seat placed on an occupant seat, the child seat comes into contact with a lower portion of the inflated airbag because the height of the child seat from the surface of the occupant seat is smaller than that of the upper half of the occupant's body. In such a case, since the near-occupant face of the airbag is not pushed inward of the airbag, the vent hole does not open.

An embodiment is disclosed in which a sensor or the like that checks whether an occupant is seated on the occupant seat or a child seat is placed on the occupant seat is provided. If it is determined that a child seat is placed on the occupant seat, an inflator is not operated. However, such an embodiment increases the cost of configuring an airbag device.

DISCLOSURE OF INVENTION

It is an object of the present invention to provide an airbag and an airbag device in which an openable-closable vent hole opens or significantly opens in both cases where an occupant comes into contact with a near-occupant face of the airbag in an inflated state and where an object, such as a child seat, comes into contact with a lower portion of the airbag in the inflated state.

According to a first embodiment, an airbag includes an openable-closable vent hole and a covering member that covers the openable-closable vent hole. The openable-closable vent hole is provided in a face of the airbag in an inflated state opposite a near-occupant face thereof or in a side face of the airbag. A connecting member is routed in the inside of the airbag, the connecting member connecting the near-occupant face of the airbag in the inflated state and the covering member and connecting a lower portion of the airbag in the inflated state and the covering member. When the airbag is inflated, the covering member is prevented by the connecting member from moving toward the outside of the airbag and overlies the openable-closable vent hole, whereby the openable-closable vent hole closes or slightly opens. In both cases where an occupant comes into contact with the near-occupant face of the inflated airbag and causes the near-occupant face to retract inward of the airbag, and where an object comes into contact with the lower portion of the airbag and causes the lower portion to retract inward of the airbag, the connecting member loosens and the covering member moves away from the openable-closable vent hole because of gas pressure inside the airbag, whereby the openable-closable vent hole opens or significantly opens.

According to a second embodiment, in the airbag according to the first embodiment, the covering member covers the openable-closable vent hole from the outside of the airbag. The covering member has at least one end thereof (hereinafter referred to as a "fixed end") connected to the airbag, and the other end thereof (hereinafter referred to as a "free end") not connected to the airbag. The airbag is provided with first and second constantly open vent holes in respective regions that are near the free end of the covering member and are not covered with the covering member, the regions being at different positions along the periphery of the openable-closable vent hole. The connecting member includes an upper connecting member that is routed through the first constantly open vent hole and in the inside of the airbag and connects the free end of the covering member and the near-occupant face of the airbag, and a lower connecting member that is routed through the second constantly open vent hole and in the inside of the airbag and connects the free end of the covering member and the lower portion of the airbag. The upper connecting member is connected to a portion of the free end of the covering member, the portion being near the first constantly open vent hole. The lower connecting member is connected to another portion of the free end of the covering member, the portion being near the second constantly open vent hole. When the airbag is inflated, the upper connecting member and the lower connecting member pull the free end of the covering member in a direction away from the fixed end, causing the covering member to be under tension along the outer surface of the airbag and to overlie the openable-closable vent hole, whereby the openable-closable vent hole closes or slightly opens. If the occupant comes into contact with the near-occupant face of the inflated airbag and causes the near-occupant face to retract inward of the airbag, the upper connecting member loosens and the portion of the free end of the covering member near the first constantly open vent hole is turned up toward the outside of the airbag because of the gas pressure inside the airbag, whereby the openable-closable vent hole opens or significantly opens. If the object comes into contact with the lower portion of the inflated airbag and causes the lower portion to retract inward of the airbag, the lower connecting member loosens and the portion of the free end of the covering member near the second constantly open vent hole is turned up toward the outside of the airbag because of the gas pressure inside the airbag, whereby the openable-closable vent hole opens or significantly opens.

According to a third embodiment, in the airbag according to the second embodiment, line segments connecting the fixed end of the covering member, the first constantly open vent hole, and the second constantly open vent hole substantially form a triangle with the foregoing elements as vertexes, the openable-closable vent hole residing within the triangle.

According to a fourth embodiment, in the airbag according to the first embodiment, the covering member covers the openable-closable vent hole from the outside of the airbag. The covering member has at least one end thereof (hereinafter referred to as a "fixed end") connected to the airbag, and the other end thereof (hereinafter referred to as a "free end") not connected to the airbag. A loop through which the connecting member is made to pass is provided at the free end of the covering member. The airbag is provided with a constantly open vent hole in a region that is near the free end of the covering member and is not covered with the covering member. The connecting member has both ends thereof connected from the inside of the airbag to the near-occupant face of the airbag and to the lower portion of the airbag, respectively, and a portion thereof halfway in the longitudinal direction routed through the constantly open vent hole to the outside of the airbag and through the loop. When the airbag is inflated, the connecting member pulls the free end of the covering member in a direction away from the fixed end, causing the covering member to be under tension along the outer surface of the airbag and to overlie the openable-closable vent hole, whereby the openable-closable vent hole closes or slightly opens. In both cases where the occupant comes into contact with the near-occupant face of the inflated airbag and causes the near-occupant face to retract inward of the airbag, and where the object comes into contact with the lower portion of the airbag and causes the lower portion to retract inward of the airbag, the entirety of the connecting member loosens and the free end of the covering member is turned up toward the outside of the airbag because of the gas pressure inside the airbag, whereby the openable-closable vent hole opens or significantly opens.

According to a fifth embodiment, in the airbag according to the fourth embodiment, the fixed end of the covering member is connected to the airbag with a linear connected portion extending in a direction intersecting a direction connecting the fixed end and the free end of the covering member. Line segments connecting both ends of the linear connected portion and the constantly open vent hole substantially form a triangle with the foregoing elements as vertexes, the openable-closable vent hole residing within the triangle.

According to a sixth embodiment, in the airbag according to the first embodiment, the covering member covers the openable-closable vent hole from the inside of the airbag. The covering member has at least one end thereof (hereinafter referred to as a "fixed end") connected to the airbag, and the other end thereof (hereinafter referred to as a "free end") not connected to the airbag. The connecting member includes an upper connecting member that is routed in the inside of the airbag and connects the free end of the covering member and the near-occupant face of the airbag, and a lower connecting member that is routed in the inside of the airbag and connects the free end of the covering member and the lower portion of the airbag. The airbag is provided with a first band and a second band through which the upper connecting member and the lower connecting member are made to pass, respectively, in respective regions that are near the free end of the covering member and are not covered with the covering member. The first band and the second band are provided at different positions along the periphery of the openable-closable vent hole. The upper connecting member is connected to a portion of the free end of the covering member, the portion being near the first band. The lower connecting member is connected to another portion of the free end of the covering member, the portion being near the second band. When the airbag is inflated, the upper connecting member and the lower connecting member pull the free end of the covering member in a direction away from the fixed end, causing the covering member to be under tension along the inner surface of the airbag and to overlie the openable-closable vent hole, whereby the openable-closable vent hole closes or slightly opens. If the occupant comes into contact with the near-occupant face of the inflated airbag and causes the near-occupant face to retract inward of the airbag, the upper connecting member loosens and the portion of the free end of the covering member near the first band is pushed out through the openable-closable vent hole toward the outside of the airbag because of the gas pressure inside the airbag, whereby the openable-closable vent hole opens or significantly opens. If the object comes into contact with the lower portion of the inflated airbag and causes the lower portion to retract inward of the airbag, the lower connecting member loosens and the portion of the free end of the covering member near the second band is pushed out through the openable-closable vent hole toward the outside of the airbag because of the gas pressure inside the airbag, whereby the openable-closable vent hole opens or significantly opens.

According to a seventh embodiment, in the airbag according to the sixth embodiment, line segments connecting the fixed end of the covering member, the first band, and the second band substantially form a triangle with the foregoing elements as vertexes, the openable-closable vent hole residing within the triangle.

According to an eighth embodiment, in the airbag according to the first embodiment, the covering member covers the openable-closable vent hole from the inside of the airbag. The covering member has at least one end thereof (hereinafter referred to as a "fixed end") connected to the airbag, and the other end thereof (hereinafter referred to as a "free end") not connected to the airbag. A loop through which the connecting member is made to pass is provided at the free end of the covering member. The airbag is provided with a band through which the connecting member is made to pass, in a region that is near the free end of the covering member and is not covered with the covering member. The connecting member has both ends thereof connected from the inside of the airbag to the near-occupant face of the airbag and to the lower portion of the airbag, respectively, a portion thereof halfway in the longitudinal direction routed through the loop of the covering member, and other portions thereof between the portion routed through the loop and both ends routed through the band. When the airbag is inflated, the connecting member pulls the free end of the covering member in a direction away from the fixed end, causing the covering member to be under tension along the inner surface of the airbag and to overlie the openable-closable vent hole, whereby the openable-closable vent hole closes or slightly opens. In both cases where the occupant comes into contact with the near-occupant face of the inflated airbag and causes the near-occupant face to retract inward of the airbag, and where the object comes into contact with the lower portion of the airbag and causes the lower portion to retract inward of the airbag, the entirety of the connecting member loosens and the free end of the covering member is pushed out through the openable-closable vent hole toward the outside of the airbag because of the gas pressure inside the airbag, whereby the openable-closable vent hole opens or significantly opens.

According to a ninth embodiment, in the airbag according to the eighth embodiment, the fixed end of the covering member is connected to the airbag with a linear connected portion extending in a direction intersecting a direction connecting the fixed end and the free end of the covering member. Line segments connecting both ends of the linear connected portion and the constantly open vent hole substantially form a triangle with the foregoing elements as vertexes, the openable-closable vent hole residing within the triangle.

According to a tenth embodiment, an airbag device includes the airbag according to the first embodiment and a gas generator that supplies gas to the airbag.

The airbag according to the first embodiment and the airbag device according to the tenth embodiment including the foregoing airbag each include the connecting member that is routed in the inside of the airbag and connects the covering member to the near-occupant face of the airbag and the lower portion of the airbag.

When this airbag is inflated, the connecting member is under tension between the near-occupant face of the airbag and the covering member and between the lower portion of the airbag and the covering member. This prevents the covering member from moving toward the outside of the airbag, and the covering member overlies the openable-closable vent hole, whereby the openable-closable vent hole closes or slightly opens. Thus, the discharge of the gas through the vent hole is regulated, and the airbag is quickly deployed.

If an occupant is seated on the occupant seat, the occupant comes into contact with the near-occupant face of the inflated airbag. In this case, since the near-occupant face is pushed by the occupant and retracts inward of the airbag, the connecting member loosens between the near-occupant face and the covering member. This loosening causes the covering member to move toward the outside of the airbag, in a direction away from the openable-closable vent hole, because of the gas pressure inside the airbag, whereby the openable-closable vent hole opens or significantly opens. Consequently, the gas is discharged through the openable-closable vent hole to the outside of the airbag. Thus, the passenger is softly received by the airbag.

If an object, such as a child seat, is placed on the occupant seat, the object comes into contact with the lower portion of the inflated airbag. In this case, since the lower portion of the airbag is pushed by the object and retracts inward of the airbag, the connecting member loosens between the lower portion of the airbag and the covering member. Therefore, this loosening also causes the covering member to move toward the outside of the airbag, in a direction away from the openable-closable vent hole, because of the gas pressure inside the airbag, whereby the openable-closable vent hole opens or significantly opens. Consequently, the gas is discharged through the openable-closable vent hole to the outside of the airbag, and the pressure inside the airbag is reduced.

Thus, in the airbag and the airbag device according to the present invention, even if any object, such as a child seat, comes into contact with the lower portion of the inflated airbag, the openable-closable vent hole opens or significantly opens. This causes the gas to be discharged through the openable-closable vent hole to the outside of the airbag and reduces the pressure inside the airbag. Hence, the lower portion of the inflated airbag is prevented (or suppressed, the same applies below) from pressing the object. This eliminates the necessity of configuring the airbag device so as not to inflate the airbag. Therefore, the airbag device can be provided with a relatively low cost.

Although the object in the present invention is, for example, a child seat or the like placed on the occupant seat, the object to be in contact with the lower portion of the airbag may be a part of the occupant body, for example, a leg or the like of an occupant.

In the present invention, the covering member may cover the openable-closable vent hole either from the outside of the airbag as in the second and fourth embodiments, or from the inside of the airbag as in the sixth and eighth embodiments.

In the second embodiment, the covering member is provided on the outside of the airbag. The covering member has at least one end thereof (the fixed end) connected to the airbag, and the other end thereof (the free end) not connected to the airbag. In this embodiment, the connecting member includes the upper connecting member that connects the free end of the covering member and the near-occupant face of the airbag, and the lower connecting member that connects the free end of the covering member and the lower portion of the airbag.

In this embodiment, the airbag is provided with the first and second constantly open vent holes in respective regions that are near the free end of the covering member and are not covered with the covering member, the regions being at different positions along the periphery of the openable-closable vent hole. The upper connecting member is routed through the first constantly open vent hole to the outside of the airbag and is connected to a portion of the free end of the covering member, the portion being near the first constantly open vent hole. The lower connecting member is routed through the second constantly open vent hole to the outside of the airbag and is connected to another portion of the free end of the covering member, the portion being near the second constantly open vent hole.

When the airbag of the second embodiment is inflated, the upper connecting member is under tension between the near-occupant face of the airbag and the free end of the covering member, and the lower connecting member is under tension between the lower portion of the airbag and the free end of the covering member. Therefore, the upper connecting member and the lower connecting member pull the free end of the covering member in a direction away from the fixed end, causing the covering member to be under tension along the outer surface of the airbag and to overlie the openable-closable vent hole, whereby the openable-closable vent hole closes or slightly opens.

If an occupant comes into contact with the near-occupant face of the inflated airbag according to the second embodiment, the near-occupant face is pushed by the occupant and retracts inward of the airbag, and the upper connecting member loosens between the near-occupant face and the covering member. Thus, the portion of the free end of the covering member near the first constantly open vent hole, i.e., the portion to which the upper connecting member is connected, is turned up toward the outside of the airbag because of the gas pressure inside the airbag, whereby the openable-closable vent hole opens or significantly opens.

If an object, such as a child seat, comes into contact with the lower portion of the inflated airbag according to the second embodiment, the lower portion of the airbag is pushed by the object, such as a child seat, and retracts inward of the airbag, and the lower connecting member loosens. Thus, the portion of the free end of the covering member near the second constantly open vent hole, i.e., the portion to which the lower connecting member is connected, is turned up toward the outside of the airbag because of the gas pressure inside the airbag, whereby the openable-closable vent hole opens or significantly opens.

In this embodiment, it is preferable that line segments connecting the fixed end of the covering member, the first constantly open vent hole, and the second constantly open vent hole substantially form a triangle with the foregoing elements as vertexes, the openable-closable vent hole residing within the triangle (the third embodiment). In this case, by providing the covering member with an outer shape substantially matching this triangle, the covering member having the minimum area can sufficiently cover the openable-closable vent hole.

Also in the fourth embodiment, the covering member is provided on the outside of the airbag. The covering member has at least one end thereof (the fixed end) connected to the airbag, and the other end thereof (the free end) not connected to the airbag. The airbag is provided with the constantly open vent hole in a region that is near the free end of the covering member and is not covered with the covering member.

In this embodiment, the loop through which the connecting member is made to pass is provided at the free end of the covering member. In this embodiment, the connecting member has both ends thereof connected from the inside of the airbag to the near-occupant face of the airbag and to the lower portion of the airbag, respectively, and a portion thereof halfway in the longitudinal direction routed through the constantly open vent hole to the outside of the airbag and through the loop.

When the airbag of the fourth embodiment is inflated, the connecting member is under tension between the near-occupant face of the airbag and the loop of the covering member, and between the loop and the lower portion of the airbag, in series. Thus, the connecting member pulls the free end of the covering member in a direction away from the fixed end, causing the covering member to be under tension along the outer surface of the airbag and to overlie the openable-closable vent hole. Consequently, the openable-closable vent hole closes or slightly opens.

In the fourth embodiment, in both cases where an occupant comes into contact with the near-occupant face of the inflated airbag and pushes the near-occupant face to retract inward of the airbag, and where an object, such as a child seat, comes into contact with the lower portion of the inflated airbag and pushes the lower portion of the airbag to retract inward of the airbag, the entirety of the connecting member loosens and the free end of the covering member is turned up toward the outside of the airbag because of the gas pressure inside the airbag, whereby the openable-closable vent hole opens or significantly opens.

In this embodiment, it is preferable that the fixed end of the covering member is connected to the airbag with the linear connected portion extending in a direction intersecting a direction connecting the fixed end and the free end of the covering member, and line segments connecting both ends of the linear connected portion and the constantly open vent hole substantially form a triangle with the foregoing elements as vertexes, the openable-closable vent hole residing within the triangle (the fifth embodiment). In this case, by providing the covering member with an outer shape substantially matching this triangle, the covering member having the minimum area can sufficiently cover the openable-closable vent hole.

In the sixth embodiment, the covering member is provided on the inside of the airbag. Also in this embodiment, the covering member has at least one end thereof (the fixed end) connected to the airbag, and the other end thereof (the free end) not connected to the airbag. In this embodiment, as in the second embodiment, the connecting member includes the upper connecting member that connects the free end of the covering member and the near-occupant face of the airbag, and the lower connecting member that connects the free end of the covering member and the lower portion of the airbag.

In this embodiment, the airbag is provided with the first band and the second band through which the upper connecting member and the lower connecting member are made to pass, respectively, in respective regions that are near the free end of the covering member and are not covered with the covering member. The first band and the second band are provided at different positions along the periphery of the openable-closable vent hole. The upper connecting member is routed through the first band and is connected to a portion of the free end of the covering member, the portion being near the first band. The lower connecting member is routed through the second band and is connected to another portion of the free end of the covering member, the portion being near the second band.

When the airbag of the sixth embodiment is inflated, as in the airbag of the second embodiment, the upper connecting member is under tension between the near-occupant face of the airbag and the free end of the covering member, and the lower connecting member is under tension between the lower portion of the airbag and the free end of the covering member. Therefore, the upper connecting member and the lower connecting member pull the free end of the covering member in a direction away from the fixed end, causing the covering member to be under tension along the inner surface of the airbag and to overlie the openable-closable vent hole, whereby the openable-closable vent hole closes or slightly opens.

If an occupant comes into contact with the near-occupant face of the inflated airbag according to the sixth embodiment, the near-occupant face is pushed by the occupant and retracts inward of the airbag, and the upper connecting member loosens between the near-occupant face and the covering member. Thus, the portion of the free end of the covering member near the first band, i.e., the portion to which the upper connecting member is connected, is pushed out through the openable-closable vent hole toward the outside of the airbag because of the gas pressure inside the airbag, whereby the openable-closable vent hole opens or significantly opens.

If an object, such as a child seat, comes into contact with the lower portion of the inflated airbag according to the sixth embodiment, the lower portion of the airbag is pushed by the object, such as a child seat, and retracts inward of the airbag, and the lower connecting member loosens. Thus, the portion of the free end of the covering member near the second band, i.e., the portion to which the lower connecting member is connected, is pushed out through the openable-closable vent hole toward the outside of the airbag because of the gas pressure inside the airbag, whereby the openable-closable vent hole opens or significantly opens.

Also in this embodiment, it is preferable that line segments connecting the fixed end of the covering member, the first band, and the second band substantially form a triangle with the foregoing elements as vertexes, the openable-closable vent hole residing within the triangle (the seventh embodiment). In this case, by providing the covering member with an outer shape substantially matching this triangle, the covering member having the minimum area can sufficiently cover the openable-closable vent hole.

Also in the eighth embodiment, the covering member is provided on the inside of the airbag, and has at least one end thereof (the fixed end) connected to the airbag, and the other end thereof (the free end) not connected to the airbag. Further, the airbag is provided with the band through which the connecting member is made to pass, in a region that is near the free end of the covering member and is not covered with the covering member.

In this embodiment, as in the fourth embodiment, the loop through which the connecting member is made to pass is provided at the free end of the covering member. The connecting member has both ends thereof connected from the inside of the airbag to the near-occupant face of the airbag and to the lower portion of the airbag, respectively, a portion thereof halfway in the longitudinal direction routed through the loop of the covering member, and other portions thereof between the portion routed through the loop and both ends routed through the band.

When the airbag of the eighth embodiment is inflated, as in the airbag of the fourth embodiment, the connecting member is under tension between the near-occupant face of the airbag and the loop of the covering member, and between the loop and the lower portion of the airbag, in series. Thus, the connecting member pulls the free end of the covering member in a direction away from the fixed end, causing the covering member to be under tension along the inner surface of the airbag and to overlie the openable-closable vent hole. Thus, the openable-closable vent hole closes or slightly opens.

Also in the eighth embodiment, in both cases where an occupant comes into contact with the near-occupant face of the inflated airbag and pushes the near-occupant face to retract inward of the airbag, and where an object, such as a child seat, comes into contact with the lower portion of the inflated airbag and pushes the lower portion of the airbag to retract inward of the airbag, the entirety of the connecting member loosens and the free end of the covering member is pushed out through the openable-closable vent hole toward the outside of the airbag because of the gas pressure inside the airbag, whereby the openable-closable vent hole opens or significantly opens.

In this embodiment, it is preferable that the fixed end of the covering member is connected to the airbag with the linear connected portion extending in a direction intersecting a direction connecting the fixed end and the free end of the covering member, and line segments connecting both ends of the linear connected portion and the constantly open vent hole substantially form a triangle with the foregoing elements as vertexes, the openable-closable vent hole residing within the triangle (the ninth embodiment). In this case, by providing the covering member with an outer shape substantially matching this triangle, the covering member having the minimum area can sufficiently cover the openable-closable vent hole.

BRIEF DESCRIPTION OF DRAWINGS

FIG. 22 is a cross-sectional view showing a state where a child seat is in contact with a lower portion of the airbag shown in FIG. 17.

DETAILED DESCRIPTION OF THE INVENTION

Embodiments of the present invention will now be described with reference to the drawings.

Figure 1:
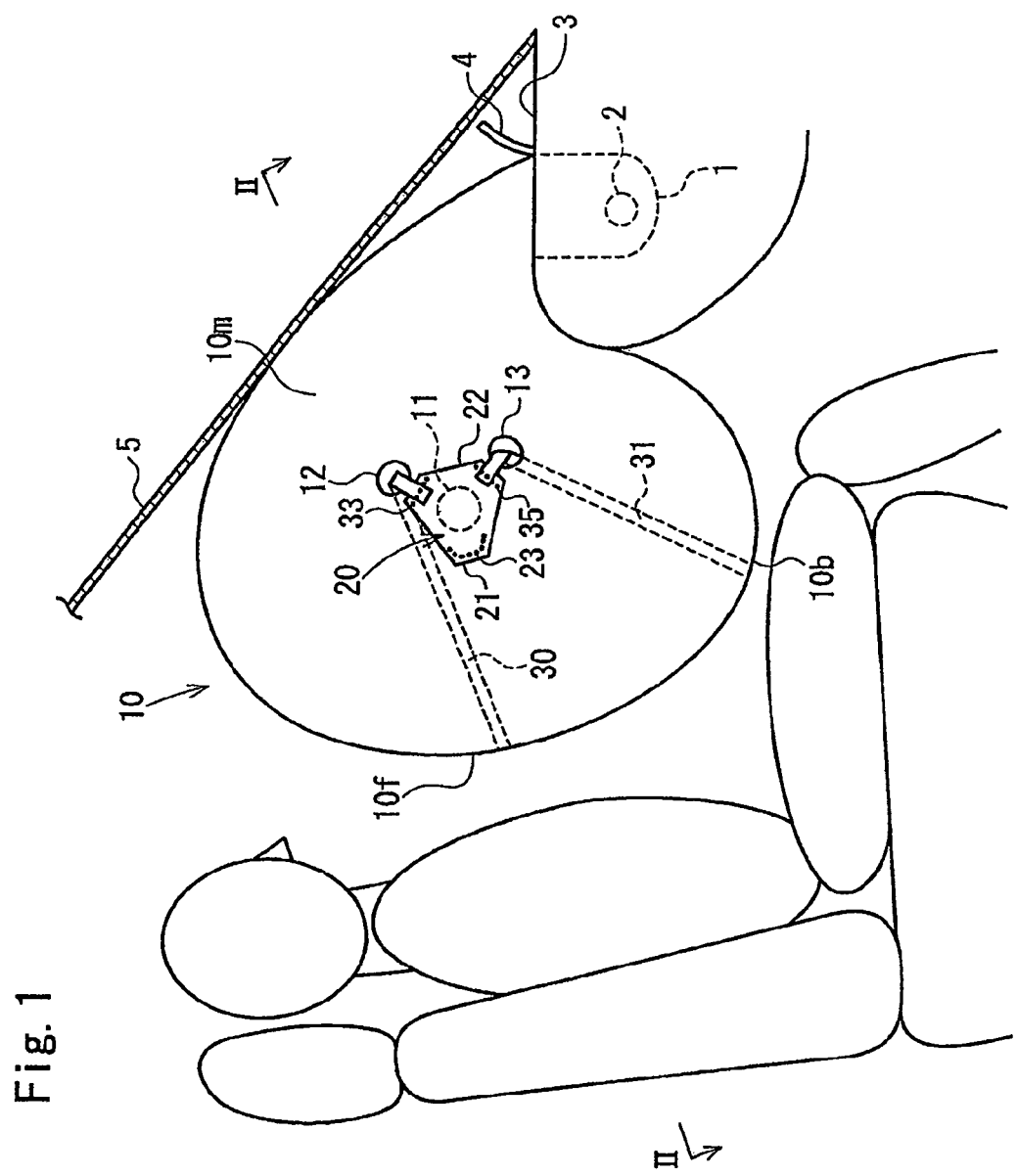
FIG. 1 is a side view of an airbag according to an embodiment in an inflated state.
Figure 2:
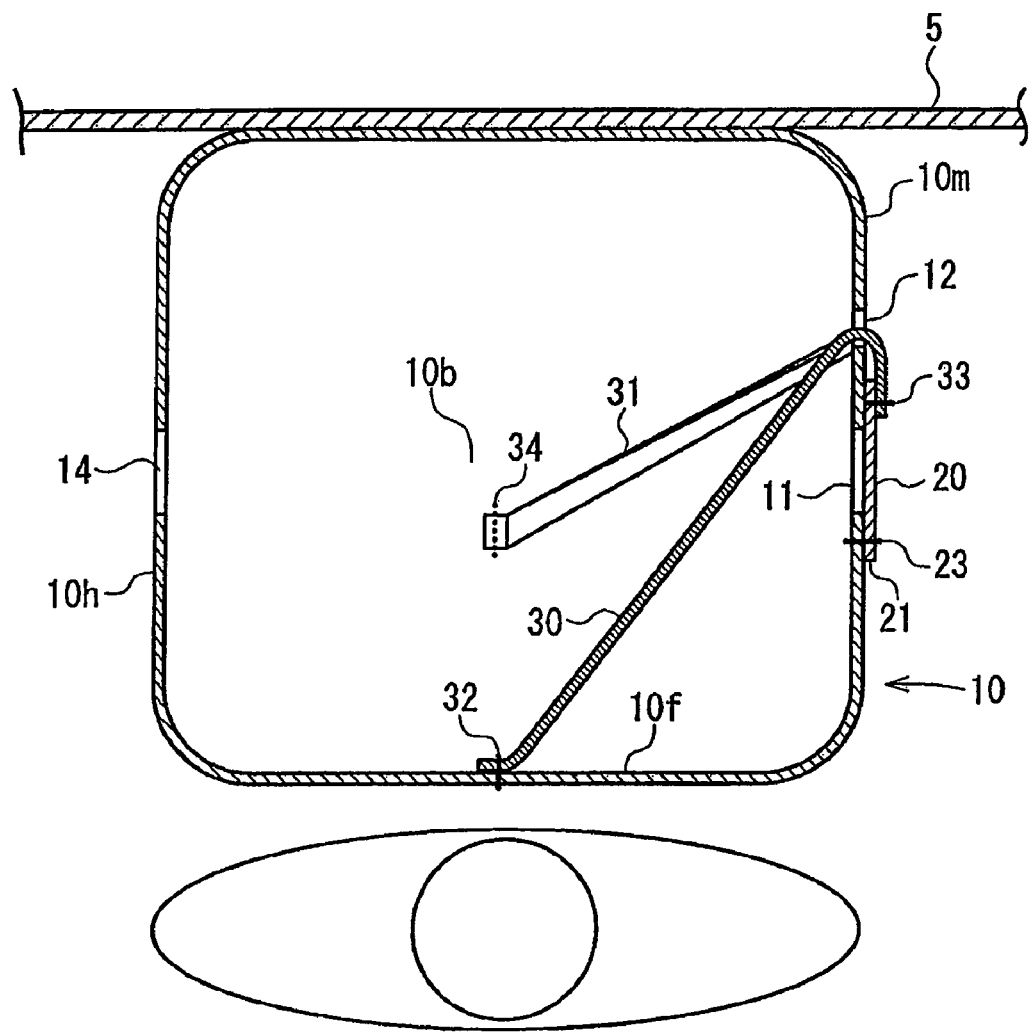
FIG. 2 is a cross-sectional view taken along the line II-II of FIG. 1.
Figure 3:
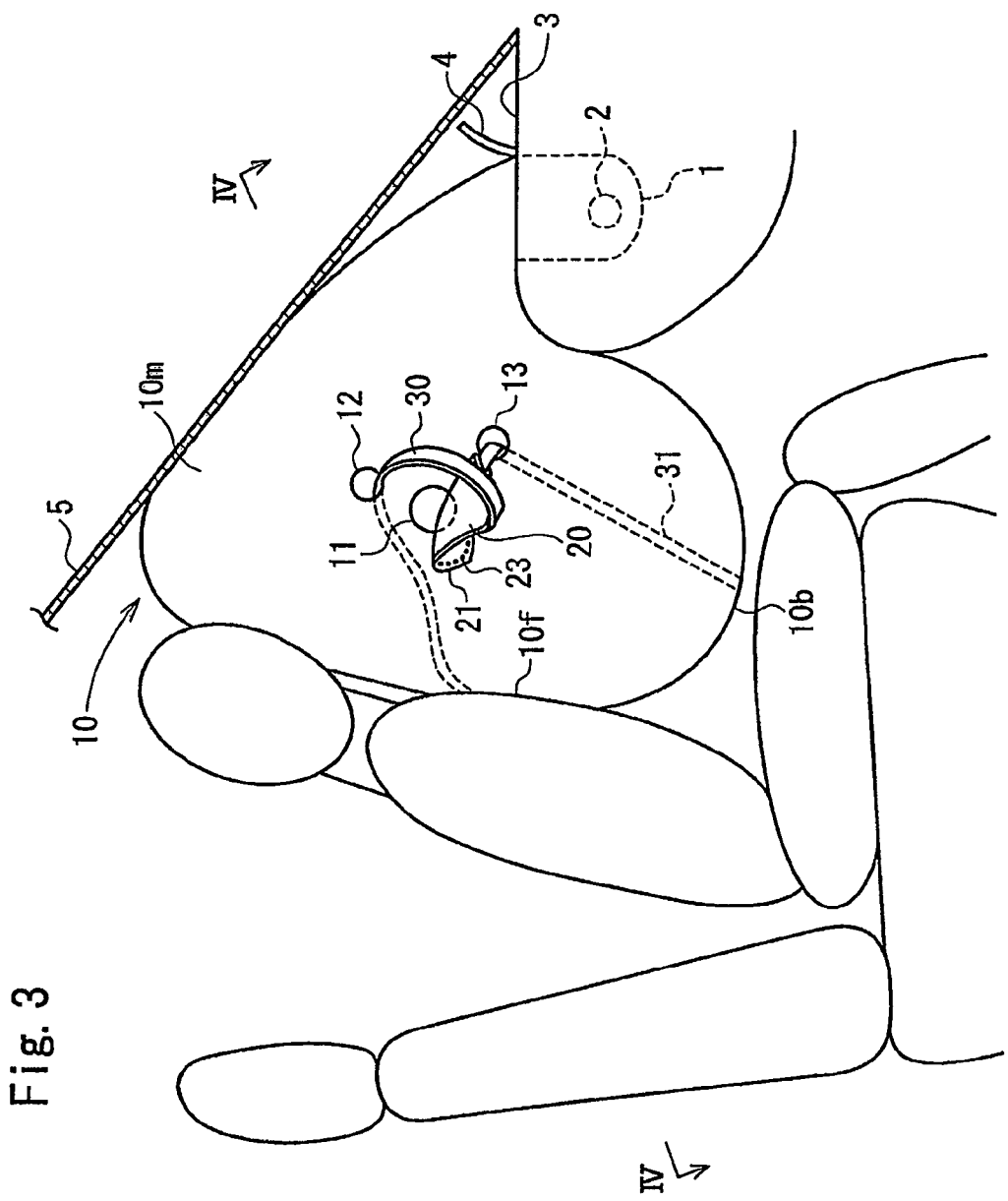
FIG. 3 is a side view showing a state where an occupant is in contact with a near-occupant face of the airbag shown in FIG. 1.
Figure 4:
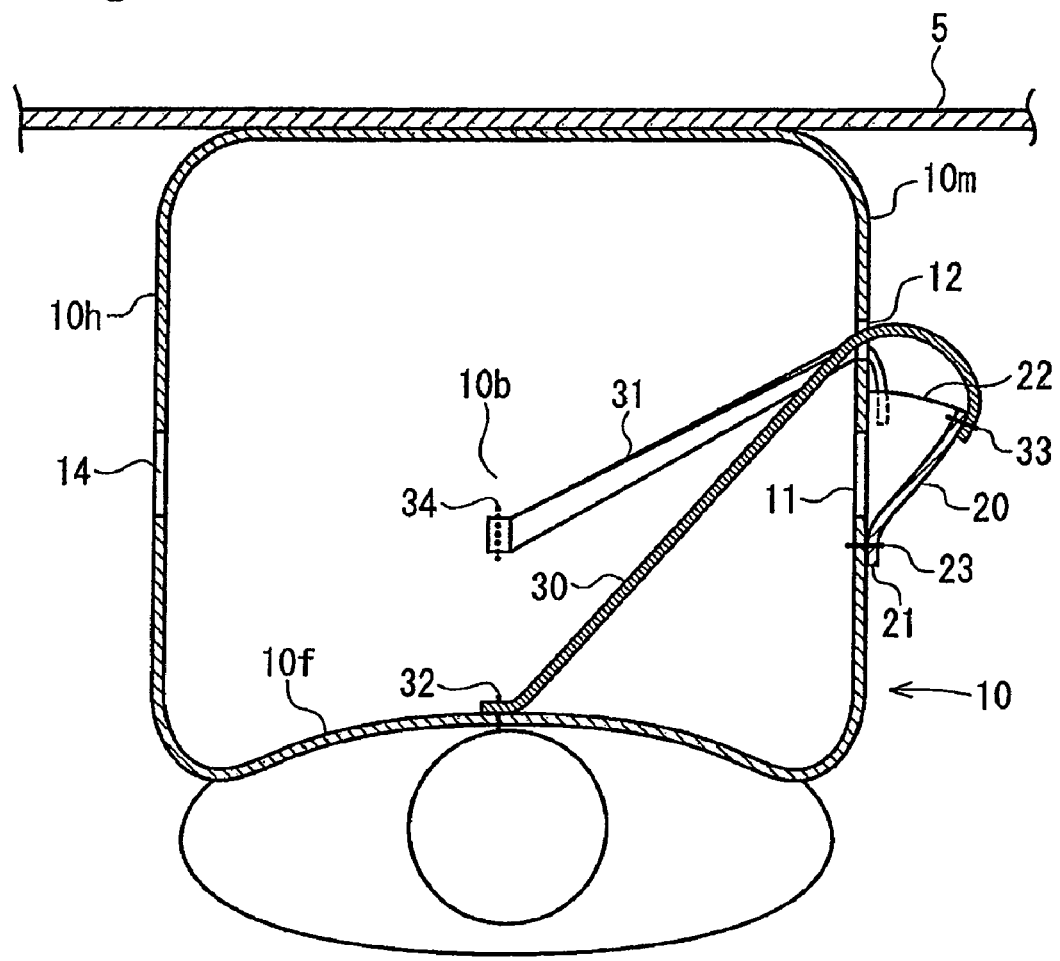
FIG. 4 is a cross-sectional view taken along the line IV-IV of FIG. 3.
Figure 5:
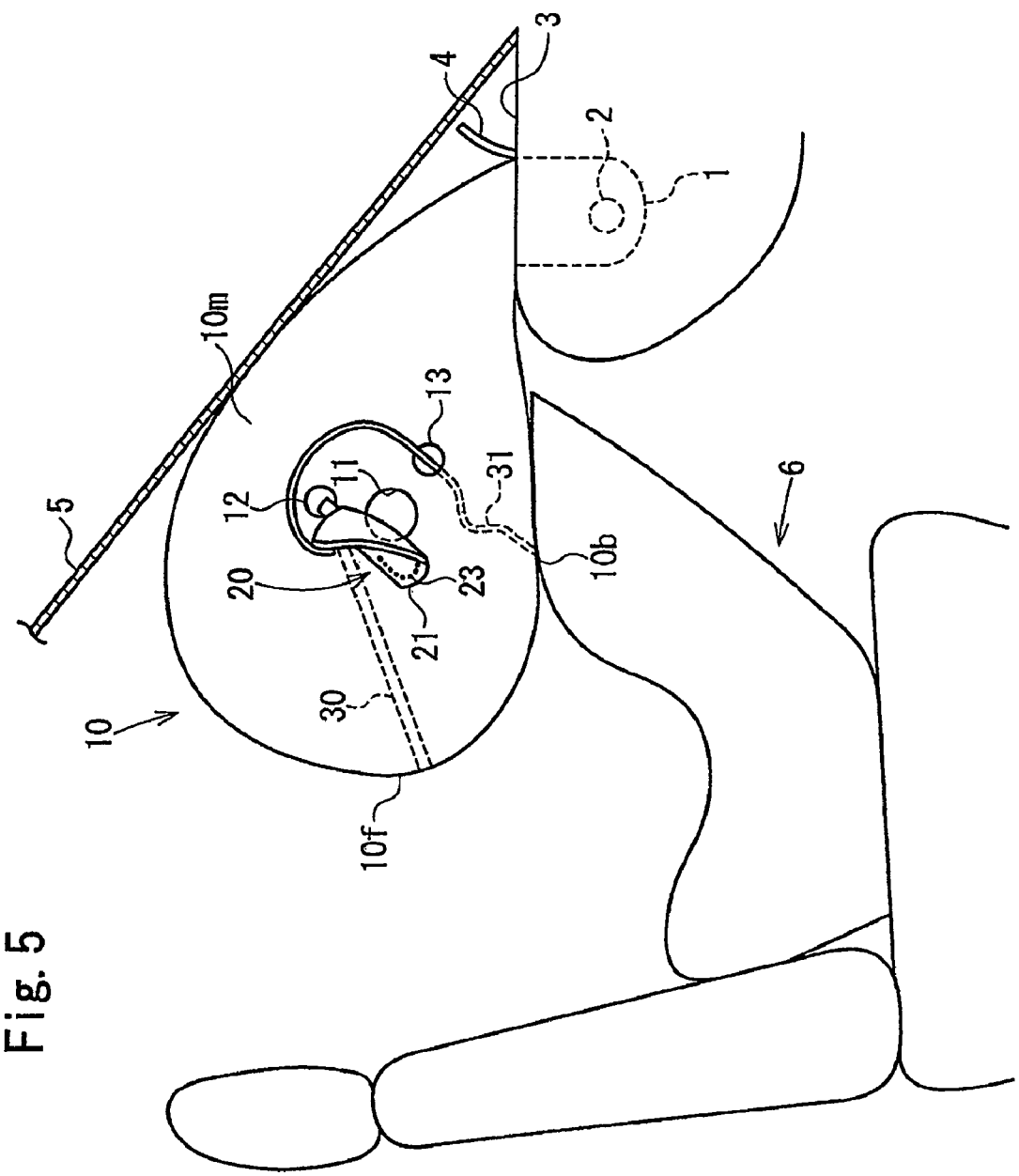
FIG. 5 is a side view showing a state where a child seat is in contact with a lower portion of the airbag shown in FIG. 1.

FIG. 1 is a side view of an airbag according to an embodiment in an inflated state. FIG. 2 is a cross-sectional view taken along the line II-II of FIG. 1. FIG. 3 is a side view showing a state where an occupant is in contact with a near-occupant face of the inflated airbag. FIG. 4 is a cross-sectional view taken along the line IV-IV of FIG. 3. FIG. 5 is a side view showing a state where a child seat is in contact with a lower portion of the inflated airbag.

An airbag 10 of this embodiment is an airbag for a passenger seat of a vehicle.

The airbag 10, in a folded state, is housed in a container 1 and is inflated by an inflator, i.e., a gas generator 2. The container 1 is provided in an instrument panel 3. The top of the container 1 is covered with a lid 4. A reference numeral 5 denotes a windshield.

In this embodiment, the airbag 10 in the inflated state has on one side thereof, i.e., a side face 10*m* on the right when seen from a passenger side in this embodiment, an openable-closable vent hole 11 that is opened and closed by a covering member 20. The covering member 20 of this embodiment covers the openable-closable vent hole 11 from the outside of the airbag 10.

The side face 10*m*, having the openable-closable vent hole 11, of the airbag 10 also has a pair of constantly open vent holes 12 and 13 at respective positions, different from each other in vertical position, away from a near-passenger face 10*f* of the airbag 10 in the inflated state with respect to the openable-closable vent hole 11, the positions not being covered with the covering member 20. Specifically, as shown in FIG. 1, the upper constantly open vent hole 12 resides higher than the openable-closable vent hole 11, and the lower constantly open vent hole 13 resides lower than the openable-closable vent hole 11. The constantly open vent holes 12 and 13 each make the inside and the outside of the airbag 10 constantly communicate with each other.

As shown in FIG. 2, the airbag 10 of this embodiment in the inflated state also has on the other side thereof, i.e., a side face 10*h* on the left when seen from the passenger side in this embodiment, another constantly open vent hole 14 that is not covered with the covering member 20 and makes the inside and the outside of the airbag 10 constantly communicate with each other.

As shown in FIG. 1, the covering member 20 of this embodiment is a substantially triangular piece of woven fabric. The covering member 20 overlies the openable-closable vent hole 11 in such a position that a corner 21 of the triangle resides near the near-passenger face 10*f* with respect to the openable-closable vent hole 11, and a side 22 opposite the corner 21 resides away from the near-passenger face 10*f* with respect to the openable-closable vent hole 11.

The covering member 20 is sewed at a position near the corner 21 thereof on the side face 10*m* of the airbag 10 with sewing thread or the like forming a seam 23. The seam 23 extends round the corner 21, with the upper end and the lower end thereof slightly approaching the upper end and the lower end, respectively, of the side 22.

Specifically, the covering member 20 of this embodiment has the corner 21 thereof serving as a fixed end and the side 22 thereof opposite the corner 21 serving as a free end.

Line segments connecting the position where the corner 21, i.e., the seam 23, of the covering member 20 is sewed on the side face 10*m* of the airbag 10, the upper constantly open vent hole 12, and the lower constantly open vent hole substantially form a triangle with the foregoing elements as vertexes. The entirety of the openable-closable vent hole 11 resides within the triangle.

The covering member 20 of this embodiment has such a shape that two sides thereof (whose reference numerals are omitted) meeting at the corner 21 extend along a line segment connecting the upper end of the seam 23 and the upper constantly open vent hole 12 and a line segment connecting the lower end of the seam 23 and the lower constantly open vent hole 13, respectively. The two sides meeting at the corner 21 have substantially the same length.

In this embodiment, there are provided as connecting members an upper tether 30 that is routed through the upper constantly open vent hole 12 and in the inside of the airbag 10 and connects the near-passenger face 10*f* of the airbag 10 in the inflated state and a portion of the side 22 of the covering member 20, and a lower tether 31 that is routed through the lower constantly open vent hole 13 and in the inside of the airbag 10 and connects a lower portion 10*b* of the airbag 10 in the inflated state and a portion of the side 22 of the covering member 20.

The upper tether 30 has one end thereof sewed from the inside of the airbag 10 on the near-passenger face 10*f* of the airbag 10 with a seam 32 (FIG. 2), and the other end thereof routed through the upper constantly open vent hole to the outside of the airbag 10 and sewed near the upper end of the side 22 of the covering member 20 with a seam 33.

Meanwhile, the lower tether 31 has one end thereof sewed from the inside of the airbag 10 on the lower portion 10*b* of the airbag 10 with a seam 34 (FIG. 2), and the other end thereof routed through the lower constantly open vent hole 13 to the outside of the airbag 10 and sewed near the lower end of the side 22 of the covering member 20 with a seam 34.

The airbag 10, before inflated, is folded in a state where the covering member 20 overlies the openable-closable vent hole 11 from the outside of the airbag 10, and is housed in the container 1.

In a passenger airbag device including the airbag 10, in the event of crashing of the vehicle or the like, the inflator 2 operates and gas is supplied from the inflator 2 to the airbag 10, whereby the airbag 10 starts to be inflated. As shown in FIG. 1, the airbag 10 pushes the lid open and is deployed from the top surface of the instrument panel 3 toward a passenger.

In this case, as shown in FIG. 2, while the near-passenger face 10*f* of the airbag 10 bulges toward the passenger, the upper tether 30 is under tension between the near-passenger face 10*f* and the side 22 of the covering member 20. Further, while the lower portion 10*b* of the airbag 10 bulges downward, the lower tether 31 is under tension between the lower portion 10*b* and the side 22 of the covering member 20. Therefore, the upper end and the lower end of the side 22 of the covering member 20 are pulled by the upper tether 30 and the lower tether 31, respectively, in a direction away from the corner 21, i.e., the seam 23, and in respective directions away from each other. Thus, the covering member 20 is under tension along the side face 10*m* of the airbag 10, i.e., the outer surface of the airbag, and therefore overlies the openable-closable vent hole 11, whereby the openable-closable vent hole 11 closes.

In this embodiment, since the airbag 10, before inflated, is folded with the covering member 20 overlying the openable-closable vent hole 11 from the outside of the airbag 10, the covering member 20 overlies the openable-closable vent hole 11 from the start of inflation of the airbag 10.

Consequently, while the airbag 10 is being inflated, the gas is regulated not to be discharged through the openable-closable vent hole 11 to the outside of the airbag 10. Hence, the pressure inside the airbag 10 quickly increases, and the airbag 10 is quickly inflated and deployed.

In a case where a passenger is seated on the passenger seat, as shown in FIGS. 3 and 4, the passenger comes into contact with the near-passenger face 10*f* of the airbag 10 in the inflated state. In this case, the near-passenger face 10*f* is pushed by the passenger and retracts inward of the airbag 10. Accordingly, the upper tether 30 loosens between the near-passenger face 10*f* and the covering member 20. This loosening causes the covering member 20 to be turned up from the upper end of the side 22 thereof, connected to the upper tether 30, in a direction away from the airbag 10 because of the gas pressure inside the airbag 10. Thus, the openable-closable vent hole 11 opens, and the gas is discharged through the openable-closable vent hole 11 and the constantly open vent holes 12, 13, and 14 to the outside of the airbag 10. Consequently, the passenger is softly received by the airbag 10.

As shown in FIG. 5, in a case where the airbag 10 is inflated with a child seat 6 placed on the passenger seat, since the height of the child seat 6 from the surface of the passenger seat is smaller than that of the upper half of the passenger's body, the child seat 6 comes into contact with the lower portion 10b of the airbag 10 in the inflated state.

In this case, as shown in FIG. 5, the lower portion 10b of the airbag 10 is pushed by the child seat 6 and retracts inward of the airbag 10. Accordingly, the lower tether 31 loosens between the lower portion 10b of the airbag 10 and the covering member 20. This loosening causes the covering member 20 to be turned up from the lower end of the side 22 thereof, connected to the lower tether 31, in a direction away from the airbag 10 because of the gas pressure inside the airbag 10. Thus, the openable-closable vent hole 11 opens, and the gas is discharged through the openable-closable vent hole 11 and the constantly open vent holes 12, 13, and 14 to the outside of the airbag 10. Consequently, the pressure inside the airbag 10 is reduced.

As described above, even if the airbag 10 is inflated with the child seat 6, instead of a passenger, placed on the passenger seat, the openable-closable vent hole 11 opens upon contact between the child seat 6 and the lower portion 10b of the airbag 10 in the inflated state, whereby the pressure inside the airbag 10 is reduced, preventing the lower portion 10b of the airbag 10 from pressing the child seat 6. This eliminates the necessity of configuring the airbag device so as not to inflate the airbag 10. Therefore, the airbag device can be provided with a relatively low cost.

In this embodiment, the line segments connecting the seam 23, with which the corner 21 of the covering member 20 is sewed on the side face 10m of the airbag 10, the upper constantly open vent hole 12, and the lower constantly open vent hole 13 substantially form a triangle with the foregoing elements as vertexes. In addition, the entirety of the openable-closable vent hole 11 resides within the triangle.

Therefore, when the upper tether 30 and the lower tether 31 are under tension and the side 22 of the covering member 20 is pulled by the upper tether 30 and the lower tether 31, a tension is applied to a region of the covering member 20 enclosed by the aforementioned triangle. Hereinafter, the region of the covering member 20 to which the tension produced when the covering member 20 is pulled by the upper tether 30 and the lower tether 31 is referred to as a tension region.

The covering member 20 of this embodiment has such a shape that the two sides thereof that meet at the corner 21 extend along a line segment connecting the upper end of the seam 23 and the upper constantly open vent hole 12 and a line segment connecting the lower end of the seam 23 and the lower constantly open vent hole 13, respectively. Specifically, the covering member 20 has a plan-view shape substantially the same as the tension region defined on the covering member 20 when the side 22 is pulled by the upper tether 30 and the lower tether 31. Therefore, when the side 22 is pulled by the upper tether 30 and the lower tether 31, almost the entirety of the covering member 20 is under tension, with little or no portion thereof not being under tension. In addition, the entirety of the openable-closable vent hole 11 is covered with the covering member 20.

Thus, in this embodiment, the covering member 20 of the minimum size can sufficiently cover the openable-closable vent hole 11, whereby the material cost can be suppressed to a low level.

Figure 6:
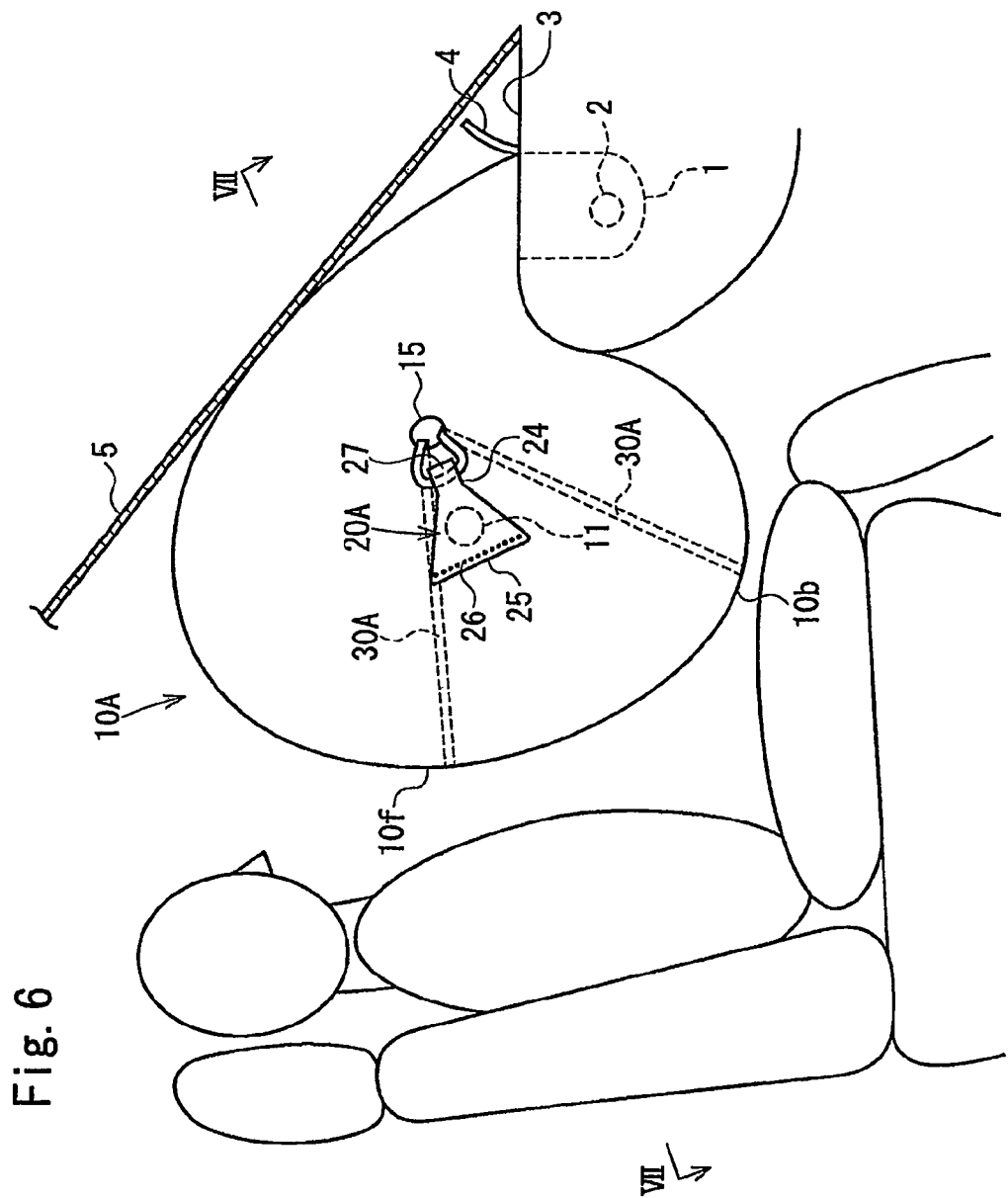
FIG. 6 is a side view of an airbag according to another embodiment in an inflated state.
Figure 7:
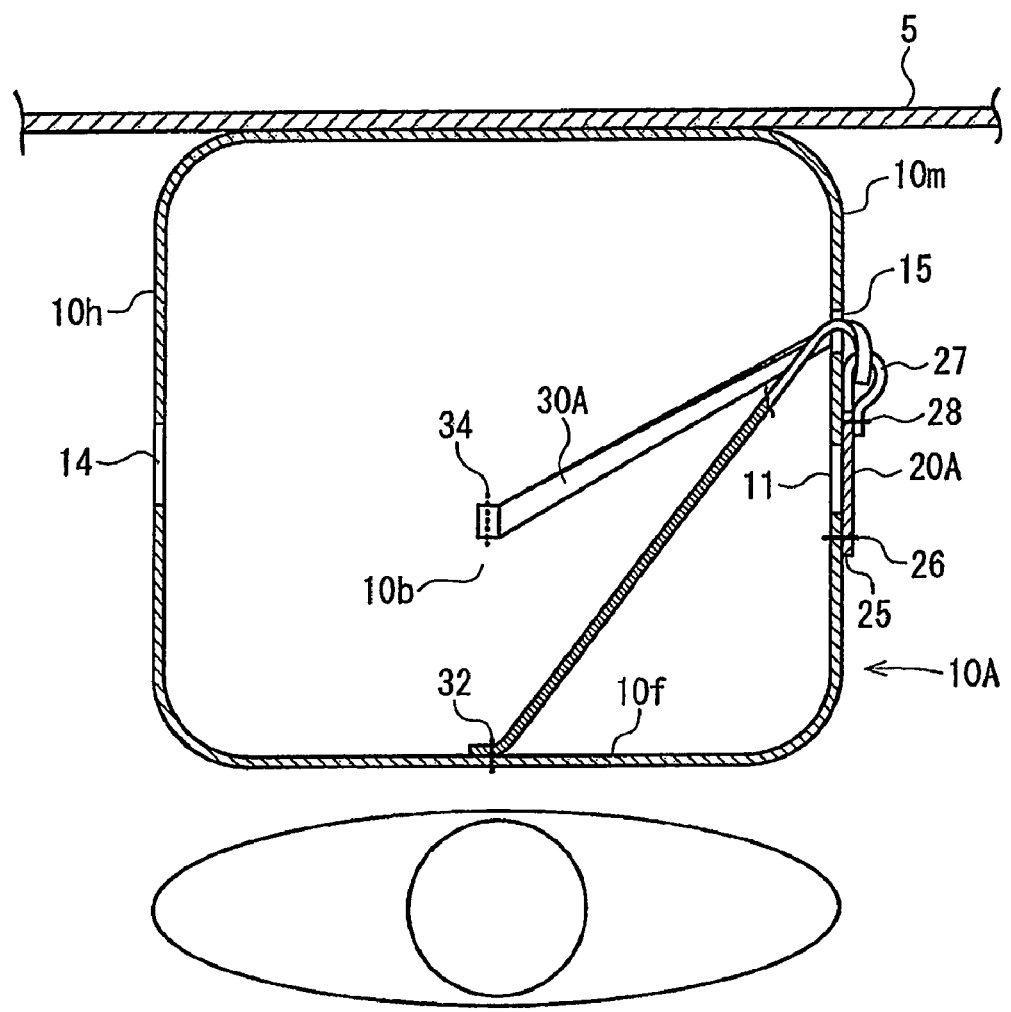
FIG. 7 is a cross-sectional view taken along the line VII-VII of FIG. 6.
Figure 8:
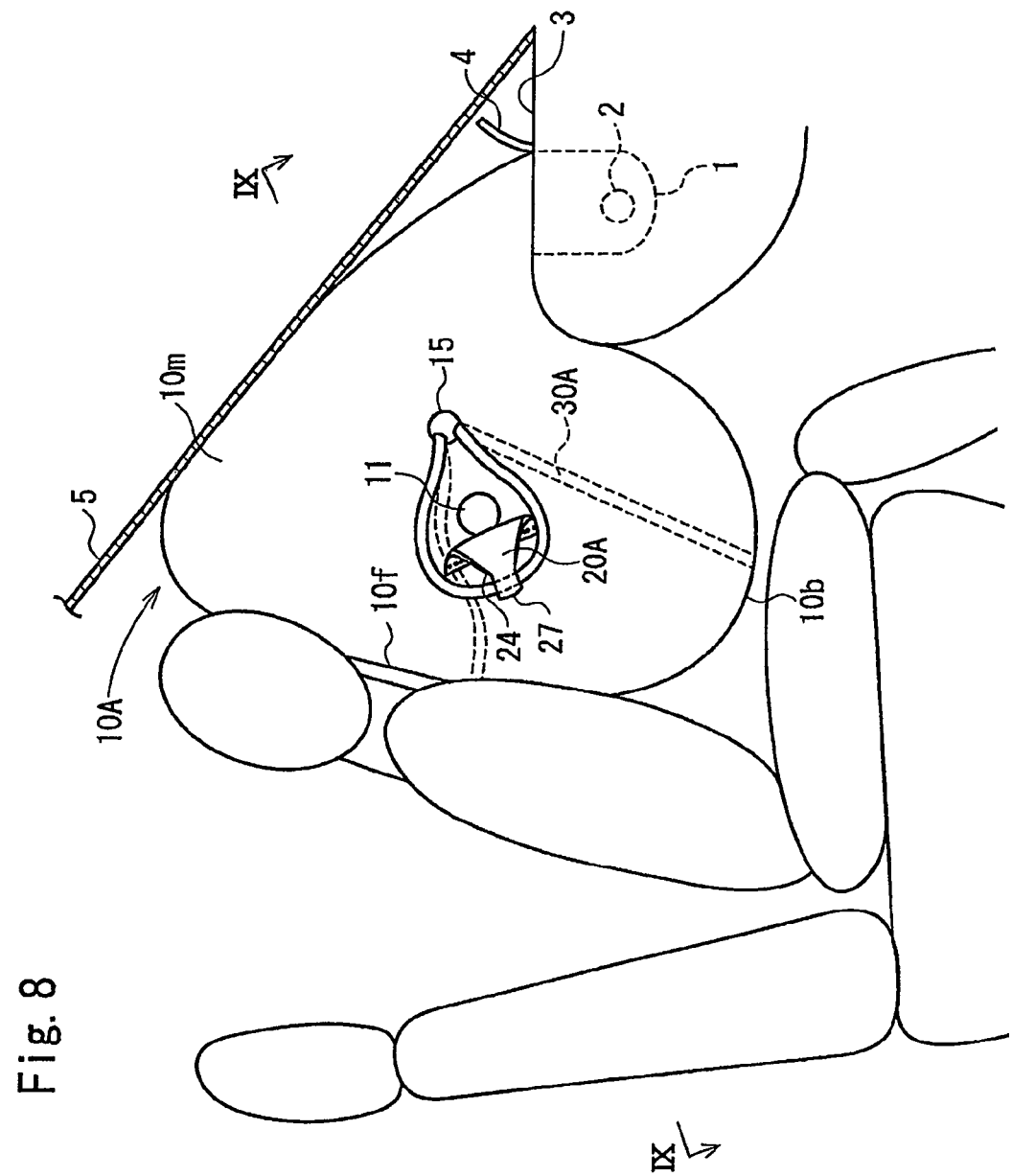
FIG. 8 is a side view showing a state where an occupant is in contact with a near-occupant face of the airbag shown in FIG. 6.
Figure 9:
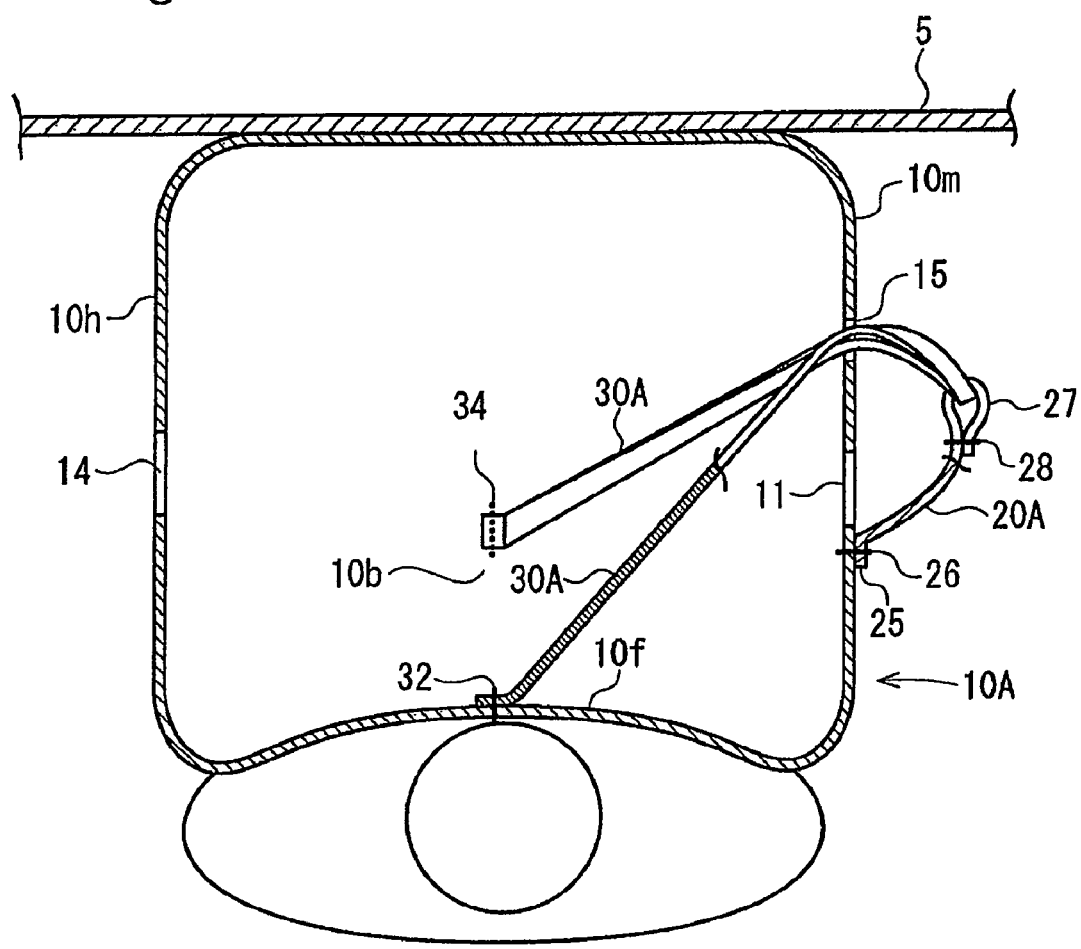
FIG. 9 is a cross-sectional view taken along the line IX-IX of FIG. 8.
Figure 10:
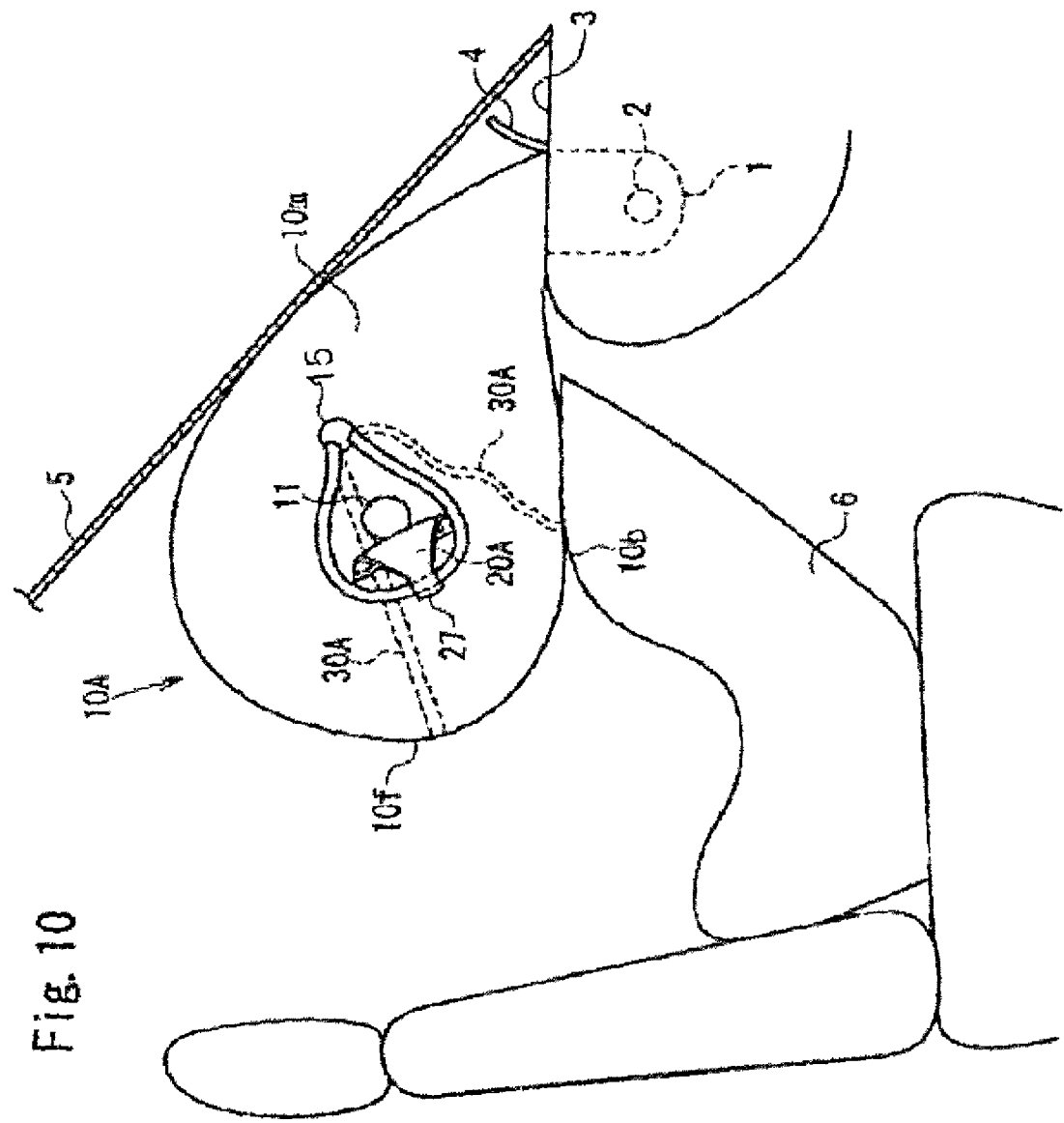
FIG. 10 is a side view showing a state where a child seat is in contact with a lower portion of the airbag shown in FIG. 6.

FIG. 6 is a side view of an airbag according to another embodiment in an inflated state. FIG. 7 is a cross-sectional view taken along the line VII-VII of FIG. 6. FIG. 8 is a side view showing a state where an occupant is in contact with a near-occupant face of the inflated airbag. FIG. 9 is a cross-sectional view taken along the line IX-IX of FIG. 8. FIG. 10 is a side view showing a state where a child seat is in contact with a lower portion of the inflated airbag.

An airbag 10A of this embodiment is also an airbag for a passenger seat of a vehicle.

Also in this embodiment, the airbag 10A in the inflated state has on one side face 10m thereof an openable-closable vent hole 11, which is opened and closed by a covering member 20A. The covering member 20A covers the openable-closable vent hole 11 from the outside of the airbag 10A.

The airbag 10A of this embodiment has on the side face 10m thereof, having the openable-closable vent hole 11, one constantly open vent hole 15 at a position away from a near-passenger face 10f of the airbag 10A in the inflated state with respect to the openable-closable vent hole 11, the position not being covered with the covering member 20A. The constantly open vent hole 15 makes the inside and the outside of the airbag 10A constantly communicate with each other.

As shown in FIG. 7, the airbag 10A of this embodiment in the inflated state also has on the other side face 10h thereof another constantly open vent hole 14 that is not covered with the covering member 20A and makes the inside and the outside of the airbag 10A constantly communicate with each other.

As shown in FIG. 6, the covering member 20A of this embodiment is also a substantially triangular piece of woven fabric. The covering member 20A of this embodiment overlies the openable-closable vent hole 11 in such a position that a corner 24 of the triangle resides away from the near-passenger face 10f with respect to the openable-closable vent hole 11, and a side 25 opposite the corner 24 resides near the near-passenger face 10f with respect to the openable-closable vent hole 11.

The covering member 20A of this embodiment is sewed on the side face 10m of the airbag 10A with a seam 26 along the side 25. The seam 26 continuously extends from the upper end to the lower end of the side 25.

Specifically, the covering member 20A of the airbag 10A has the side 25 thereof serving as a fixed end and the corner 24 thereof opposite the side 25 serving as a free end.

In this embodiment, line segments connecting the upper end and the lower end of the seam 26 and the constantly open vent hole 15 substantially form a triangle with the foregoing elements as vertexes. In addition, the entirety of the openable-closable vent hole 11 resides within the triangle.

The covering member 20A of this embodiment has such a shape that two sides thereof (whose reference numerals are omitted) meeting at the corner 24 extend along a line segment connecting the upper end of the seam 26 and the constantly open vent hole 15 and a line segment connecting the lower end of the seam 26 and the constantly open vent hole 15, respectively. The two sides meeting at the corner 24 have substantially the same length.

The covering member 20A of this embodiment has at the corner 24 thereof a loop 27 through which a tether 30A, serving as a connecting member described below, is made to pass. In this embodiment, the loop 27 is constituted by a small piece of cloth having a shape of a tongue extending from the corner 24, the tip of the small piece of cloth being folded to meet the base thereof and sewed on the base with a seam 28 (FIG. 7). However, the loop 27 is not limited to have such a configuration.

In this embodiment, a single connecting member, i.e., the tether 30A, connects the near-passenger face 10f and a lower portion 10b of the airbag 10A in the inflated state and the corner 24 of the covering member 20A. Specifically, the tether 30A of this embodiment has one end thereof sewed from the inside of the airbag 10A on the near-passenger face 10f of the airbag 10A with a seam 32, the other end thereof sewed from the inside of the airbag 10A on the lower portion 10b of the airbag 10A with a seam 34, and a portion thereof halfway in the longitudinal direction routed through the constantly open vent hole 15 to the outside of the airbag 10A and through the loop 27 at the corner 24 of the covering member 20A.

The other configurations of the airbag 10A and an airbag device including the airbag 10A are the same as those in the above-described embodiment shown in FIGS. 1 to 5. In FIGS. 6 to 10, the same reference numerals are used to denote the same elements as those shown in FIGS. 1 to 5.

The airbag 10A, before inflated, is also folded in a state where the covering member 20A overlies the openable-closable vent hole 11 from the outside of the airbag 10A, and is housed in a container 1.

Also in a passenger airbag device including the airbag 10A, in the event of crashing of the vehicle or the like, an inflator 2 operates and gas is supplied from the inflator 2 to the airbag 10A, whereby the airbag 10A starts to be inflated. As shown in FIG. 6, the airbag 10A pushes a lid 4 open and is deployed from the top surface of an instrument panel 3 toward a passenger.

In this case, as shown in FIG. 6, while the near-passenger face 10f of the airbag 10A bulges toward the passenger, the one end of the tether 30A is pulled toward the passenger side. Further, while the lower portion 10b of the airbag 10A bulges downward, the other end of the tether 30A is pulled downward. This causes the tether 30A to be under tension between the near-passenger face 10f of the airbag 10A and the loop 27 of the covering member 20A, and between the loop 27 and the lower portion 10b of the airbag 10A, in series.

Therefore, the loop 27 of the covering member 20A is pulled by the tether 30A in a direction away from the side 25, i.e., the seam 26. Thus, the covering member 20A is under tension along the side face 10m of the airbag 10A, i.e., the outer surface of the airbag, and therefore overlies the openable-closable vent hole 11, whereby the openable-closable vent hole 11 closes.

Also in this embodiment, since the airbag 10A, before inflated, is folded with the covering member 20A overlying the openable-closable vent hole 11 from the outside of the airbag 10A, the covering member 20A overlies the openable-closable vent hole 11 from the start of inflation of the airbag 10A.

Consequently, while the airbag 10A is being inflated, the gas is regulated not to be discharged through the openable-closable vent hole 11 to the outside of the airbag 10A. Hence, the pressure inside the airbag 10A quickly increases, and the airbag 10A is quickly inflated and deployed.

In a case where a passenger is seated on the passenger seat, as shown in FIGS. 8 and 9, the passenger comes into contact with the near-passenger face 10f of the airbag 10A in the inflated state, and the near-passenger face 10f is pushed by the passenger and retracts inward of the airbag 10A. With the retracting of the near-passenger face 10f, the entirety of the tether 30A loosens. This loosening causes the covering member 20A to be turned up from the corner 24 thereof in a direction away from the airbag 10A because of the gas pressure inside the airbag 10A. Thus, the openable-closable vent hole 11 opens, and the gas is discharged through the openable-closable vent hole 11 and the constantly open vent holes 14 and 15 to the outside of the airbag 10A. Consequently, the passenger is softly received by the airbag 10A.

As shown in FIG. 10, in a case where the airbag 10A is inflated with a child seat 6 placed on the passenger seat, the child seat 6 comes into contact with the lower portion 10b of the airbag 10A in the inflated state, and the lower portion 10b of the airbag 10A is pushed by the child seat 6 and retracts inward of the airbag 10A. Also in this case, the entirety of the tether 30A loosens with the retracting of the lower portion 10b of the airbag 10A. This loosening causes the covering member 20A to be turned up from the corner 24 thereof in a direction away from the airbag 10A because of the gas pressure inside the airbag 10A. Thus, the openable-closable vent hole 11 opens, and the gas is discharged through the openable-closable vent hole 11 and the constantly open vent holes 14 and 15 to the outside of the airbag 10A. Consequently, the pressure inside the airbag 10A is reduced.

As described above, even if the airbag 10A is inflated with the child seat 6, instead of a passenger, placed on the passenger seat, the openable-closable vent hole 11 opens upon contact between the child seat 6 and the lower portion 10b of the airbag 10A in the inflated state, whereby the pressure inside the airbag 10A is reduced, preventing the lower portion 10b of the airbag 10A from pressing the child seat 6. This eliminates the necessity of configuring the airbag device so as not to inflate the airbag 10A. Therefore, the airbag device can be provided with a relatively low cost.

In this embodiment, the line segments connecting the constantly open vent hole 15 and the upper end and the lower end of the seam 26, with which the side 25 of the covering member 20A is sewed on the side face 10m of the airbag 10A, substantially form a triangle with the foregoing elements as vertexes. In addition, the entirety of the openable-closable vent hole 11 resides within the triangle.

The covering member 20A of this embodiment has such a shape that two sides thereof meeting at the corner 24 extend along a line segment connecting the upper end of the seam 26 and the constantly open vent hole 15 and a line segment connecting the lower end of the seam 26 and the constantly open vent hole 15, respectively. Specifically, the covering member 20A has a plan-view shape substantially the same as the tension region defined on the covering member 20A when the corner 24 is pulled by the tether 30A. Therefore, when the corner 24 is pulled by the tether 30A, almost the entirety of the covering member 20A is under tension, with little or no portion thereof not being under tension. In addition, the entirety of the openable-closable vent hole 11 is covered with the covering member 20A.

Thus, also in this embodiment, the covering member 20A of the minimum size can sufficiently cover the openable-closable vent hole 11, whereby the material cost can be suppressed to a low level.

Figure 11:
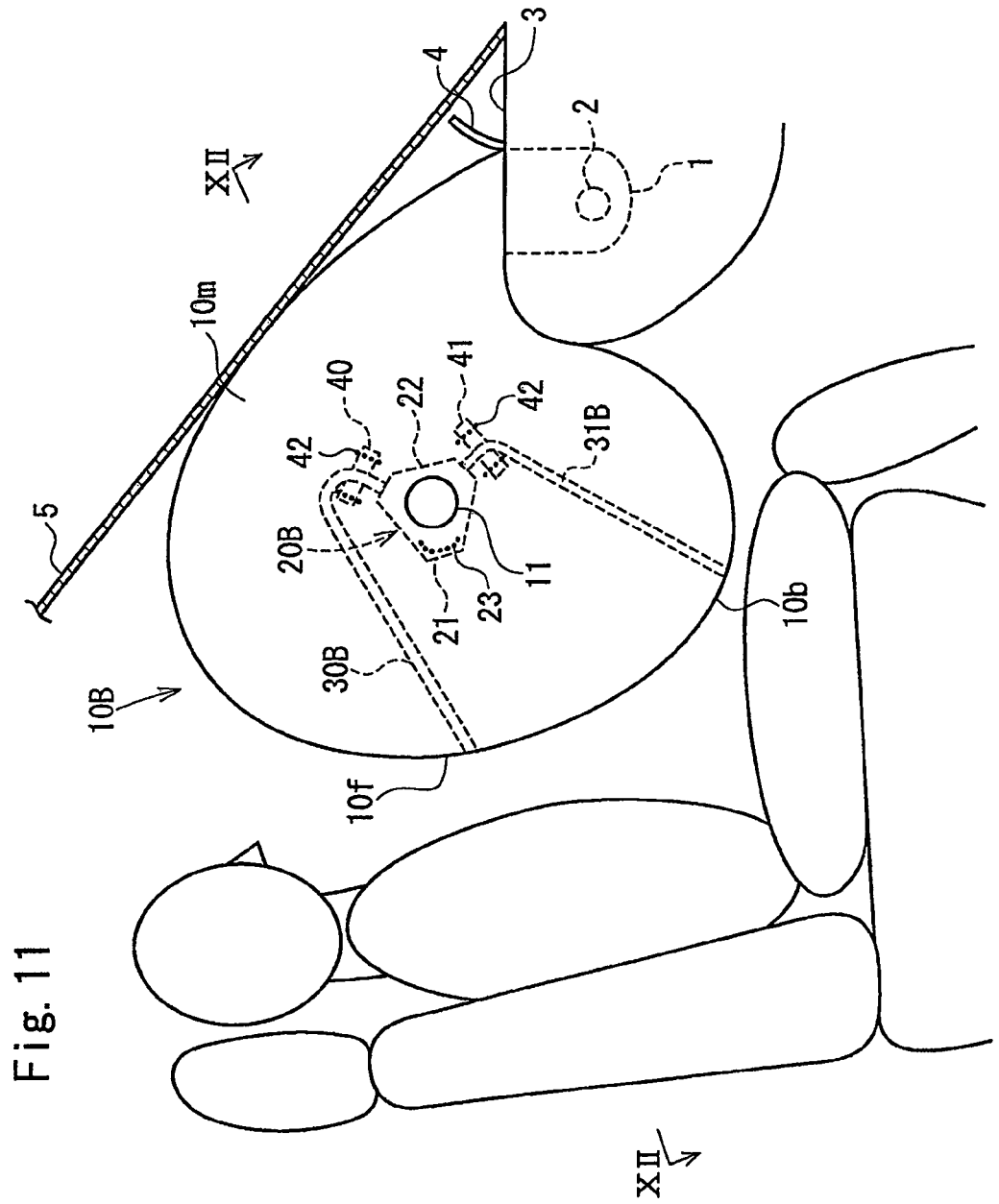
FIG. 11 is a side view of an airbag according to yet another embodiment in an inflated state.
Figure 12:
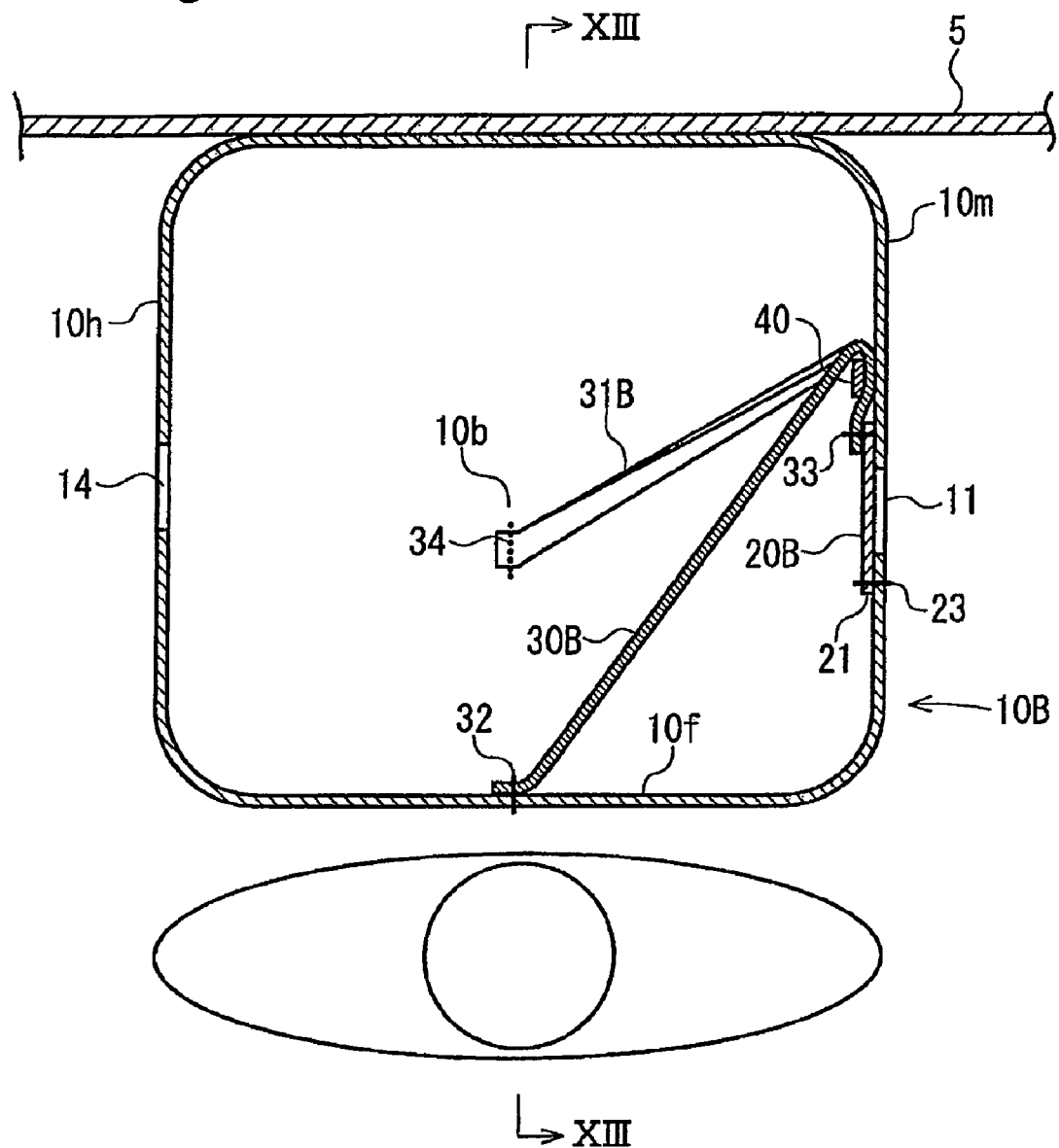
FIG. 12 is a cross-sectional view taken along the line XII-XII of FIG. 11.
Figure 13:
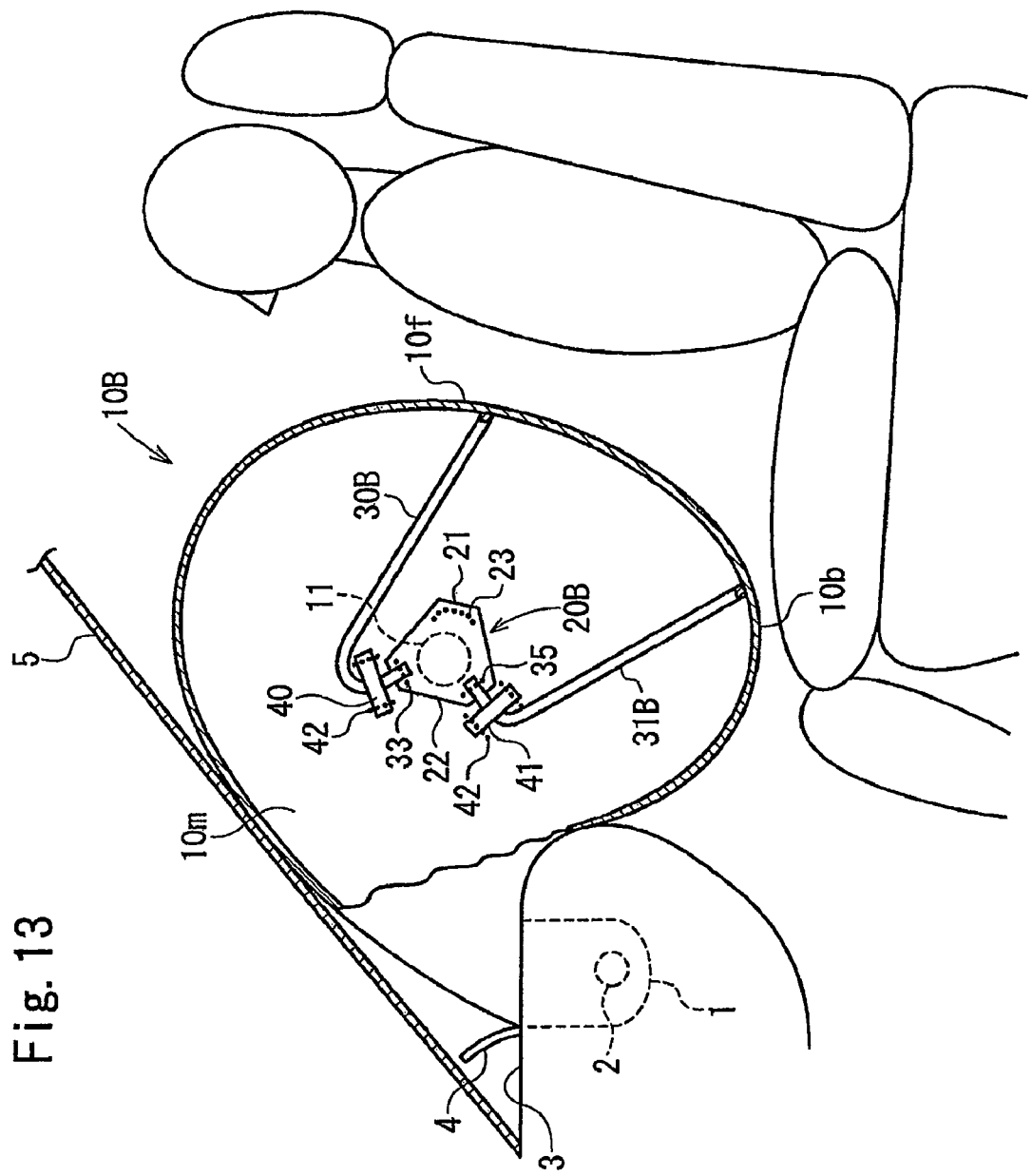
FIG. 13 is a cross-sectional view taken along the line XIII-XIII of FIG. 12.
Figure 14:
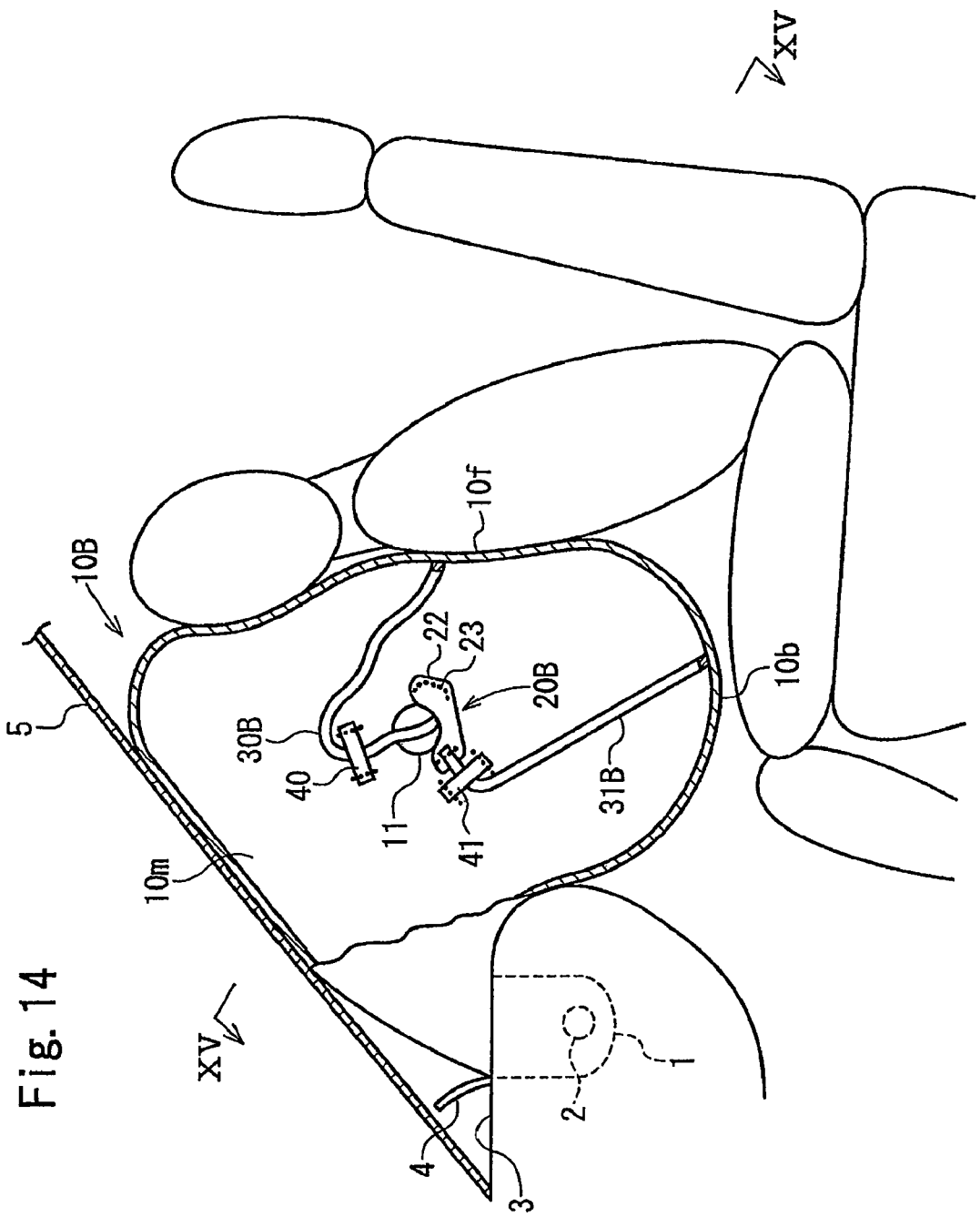
FIG. 14 is a cross-sectional view showing a state where an occupant is in contact with a near-occupant face of the airbag shown in FIG. 11.
Figure 15:
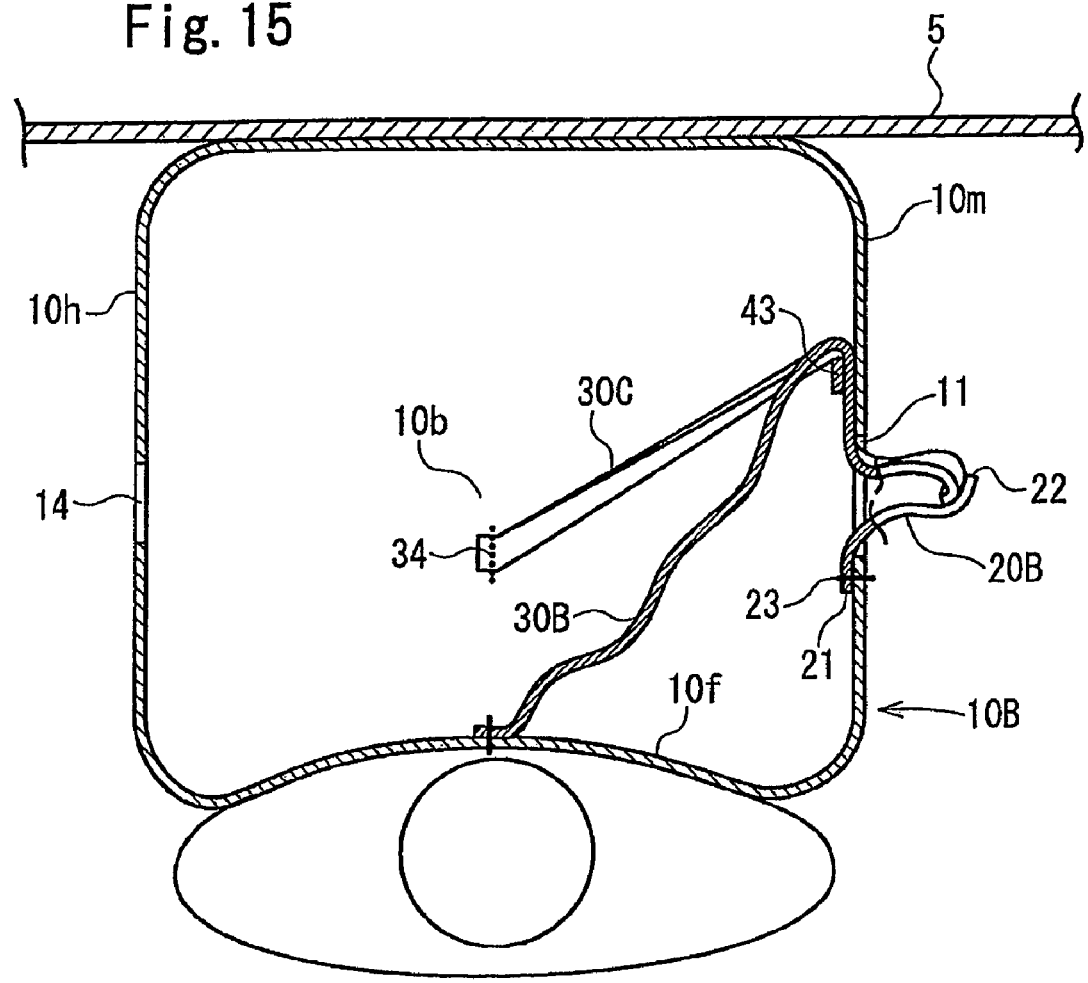
FIG. 15 is a cross-sectional view taken along the line XV-XV of FIG. 14.
Figure 16:
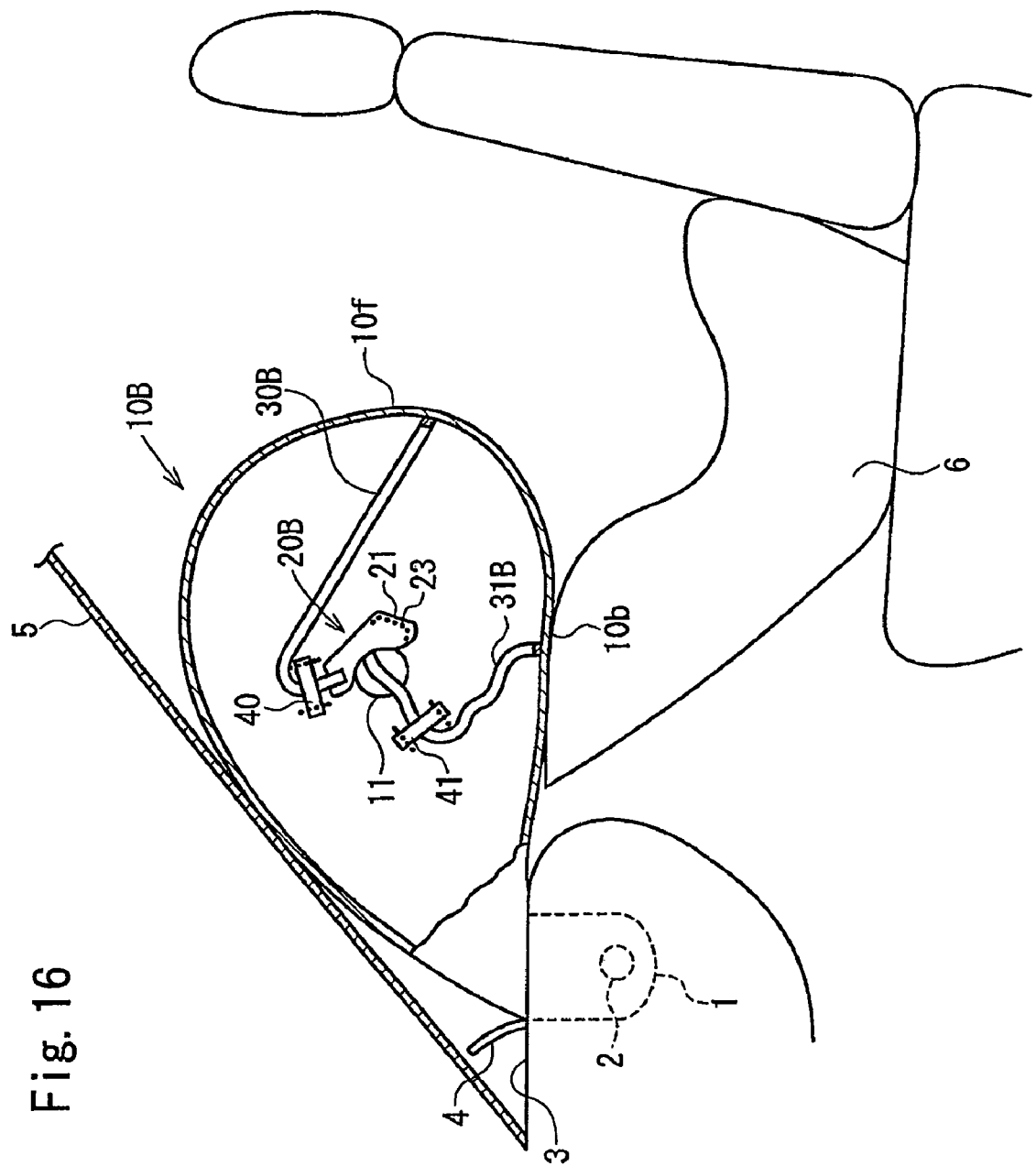
FIG. 16 is a cross-sectional view showing a state where a child seat is in contact with a lower portion of the airbag shown in FIG. 11.

FIG. 11 is a side view of an airbag according to yet another embodiment in an inflated state. FIG. 12 is a cross-sectional view taken along the line XII-XII of FIG. 11. FIG. 13 is a cross-sectional view taken along the line XIII-XIII of FIG. 12. FIG. 14 is a cross-sectional view showing a state where an occupant is in contact with a near-occupant face of the inflated airbag. FIG. 15 is a cross-sectional view taken along the line xv-xv of FIG. 14. FIG. 16 is a cross-sectional view showing a state where a child seat is in contact with a lower portion of the inflated airbag.

An airbag 10B of this embodiment is also an airbag for a passenger seat of a vehicle.

Also in this embodiment, the airbag 10B in the inflated state has on one side face 10m thereof an openable-closable vent hole 11, which is opened and closed by a covering member 20B.

In this embodiment, the covering member 20B covers the openable-closable vent hole 11 from the inside of the airbag 10B.

As shown in FIG. 13, the covering member 20B is the same as the covering member 20 of the embodiment shown in FIGS. 1 to 5, except that the covering member 20B is provided inside the airbag 10B. Specifically, the covering member 20B is also a substantially triangular piece of woven fabric. The covering member 20B overlies the openable-closable vent hole 11 in such a position that a corner 21 of the triangle resides near a near-passenger face 10f of the airbag 10B with respect to the openable-closable vent hole 11, and a side 22 opposite the corner 21 resides away from the near-passenger face 10f with respect to the openable-closable vent hole 11. The covering member 20B is also sewed at a position near the corner 21 on the side face 10m of the airbag 10B (on the inner surface of the airbag) with sewing thread or the like forming a seam 23.

Therefore, the covering member 20B of this embodiment also has the corner 21 thereof serving as a fixed end and the side 22 thereof opposite the corner 21 serving as a free end.

In this airbag 10B, as in the airbag 10 shown in FIGS. 1 to 5, there are provided as connecting members an upper tether 30B that is routed in the inside of the airbag 10B and connects the near-passenger face 10f of the airbag 10B in the inflated state and a point on the side 22 of the covering member 20B, and a lower tether 31B that is routed in the inside of the airbag 10B and connects a lower portion 10b of the airbag 10B in the inflated state and a point on the side 22 of the covering member 20B.

The airbag 10B of this embodiment is provided on the inner surface of the side face 10m thereof with bands 40 and 41, through which the tethers 30B and 31B are made to pass, at respective positions, different in vertical position, away from a near-passenger face 10f of the airbag 10B with respect to the openable-closable vent hole 11, the positions not being covered with the covering member 20B. The upper band 40 resides higher than the openable-closable vent hole 11, and the lower band 41 resides lower than the openable-closable vent hole 11.

In this embodiment, the bands 40 and 41 are each a small piece of cloth having a substantially rectangular shape and are placed on the side face 10m from the inside of the airbag, with the ends thereof in the longitudinal direction sewed on the side face 10m with seams 42. However, the bands 40 and 41 are not limited to have such configurations. For example, although not shown, a pair of slits extending parallel to each other may alternatively be provided on the side face 10m, instead of a band. In that case, the tether is made to pass from one of the slits through to the other. Of course, any other configuration is also acceptable.

The upper tether 30B has one end thereof sewed from the inside of the airbag 10B on the near-passenger face 10f of the airbag 10B with a seam 32 (FIG. 12), and the other end thereof routed through the upper band 40 from the side away from the covering member 20B toward the covering member 20B and sewed near the upper end of the side 22 of the covering member 20B with a seam 33.

Meanwhile, the lower tether 31B has one end thereof sewed from the inside of the airbag 10B on the lower portion 10b of the airbag 10B with a seam 34 (FIG. 12), and the other end thereof routed through the lower band 41 from the side away from the covering member 20B toward the covering member 20B and sewn near the lower end of the side 22 of the covering member 20B with a seam 34.

Also in this embodiment, line segments connecting the seam 23, with which the corner 21 of the covering member 20B is sewed on the side face 10m of the airbag 10B, the upper band 40, and the lower band 41 substantially form a triangle with the foregoing elements as vertexes. The entirety of the openable-closable vent hole 11 resides within the triangle.

In addition, the covering member 20B has such a shape that two sides thereof (whose reference numerals are omitted) meeting at the corner 21 extend along a line segment connecting the upper end of the seam 23 and the upper band 40 and a line segment connecting the lower end of the seam 23 and the lower band 41, respectively.

In the airbag 10B, no constantly open vent holes but the openable-closable vent hole 11 is provided on the side face 10m, and a constantly open vent hole 14 is provided only on a side face 10h opposite the side face 10m. However, another constantly open vent hole may also be provided on the side face 10m having the openable-closable vent hole 11.

The other configurations of the airbag 10B and an airbag device including the airbag 10B are the same as those in the embodiment shown in FIGS. 1 to 5. In FIGS. 11 to 16, the same reference numerals are used to denote the same elements as those shown in FIGS. 1 to 5.

The airbag 10B, before inflated, is also folded in a state where the covering member 20B overlies the openable-closable vent hole 11 from the inside of the airbag 10B, and is housed in a container 1.

Also in a passenger airbag device including the airbag 10B, in the event of crashing of the vehicle or the like, an inflator 2 operates and gas is supplied from the inflator 2 to the airbag 10B, whereby the airbag 10B starts to be inflated. As shown in FIGS. 11 and 13, the airbag 10B pushes a lid 4 open and is deployed from the top surface of an instrument panel 3 toward a passenger.

In this case, as shown in FIGS. 12 and 13, while the near-passenger face 10f of the airbag 10B bulges toward the passenger, the upper tether 30B is under tension between the near-passenger face 10f and the side 22 of the covering member 20B. Further, while the lower portion 10b of the airbag 10B bulges downward, the lower tether 31B is under tension between the lower portion 10b and the side 22 of the covering member 20B. Therefore, the upper end and the lower end of the side 22 of the covering member 20B are pulled by the upper tether 30B and the lower tether 31B, respectively, in a direction away from the corner 21, i.e., the seam 23, and in respective directions away from each other. Thus, the covering member 20B is under tension along the side face 10m of the airbag 10B, i.e., the inner surface of the airbag, and therefore overlies the openable-closable vent hole 11, whereby the openable-closable vent hole 11 closes.

Also in this embodiment, since the airbag 10B, before inflated, is folded with the covering member 20B overlying the openable-closable vent hole 11 from the inside of the airbag 10B, the covering member 20B overlies the openable-closable vent hole 11 from the start of inflation of the airbag 10B.

Consequently, while the airbag 10B is being inflated, the gas is regulated not to be discharged through the openable-closable vent hole 11 to the outside of the airbag 10B. Hence, the pressure inside the airbag 10B quickly increases, and the airbag 10B is quickly inflated and deployed.

In a case where a passenger is seated on the passenger seat, as shown in FIGS. 14 and 15, the passenger comes into contact with the near-passenger face 10f of the airbag 10B in the inflated state. In this case, the near-passenger face 10f is pushed by the passenger and retracts inward of the airbag 10B. Accordingly, the upper tether 30B loosens between the near-passenger face 10f and the covering member 20B. This loosening causes the covering member 20B to be pushed out of the airbag 10B through the openable-closable vent hole 11, from the upper end of the side 22 thereof, connected to the upper tether 30B, because of the gas pressure inside the airbag 10B. Thus, the openable-closable vent hole 11 opens, and the gas is discharged through the openable-closable vent hole 11 and the constantly open vent hole 14 to the outside of the airbag 10B. Consequently, the passenger is softly received by the airbag 10B.

As shown in FIG. 16, in a case where the airbag 10B is inflated with a child seat 6 placed on the passenger seat, since the height of the child seat 6 from the surface of the passenger seat is smaller than that of the upper half of the passenger's body, the child seat 6 comes into contact with the lower portion 10b of the airbag 10B in the inflated state.

In such a case, as shown in FIG. 16, the lower portion 10b of the airbag 10B is pushed by the child seat 6 and retracts inward of the airbag 10B. Accordingly, the lower tether 31B loosens between the lower portion 10b of the airbag 10B and the covering member 20B. This loosening causes the covering member 20B to be pushed out of the airbag 10B through the openable-closable vent hole 11, from the lower end of the side 22 thereof, connected to the lower tether 31B, because of the gas pressure inside the airbag 10B. Thus, the openable-closable vent hole 11 opens, and the gas is discharged through the openable-closable vent hole 11 and the constantly open vent hole 14 to the outside of the airbag 10B. Consequently, the pressure inside the airbag 10B is reduced.

As described above, even if the airbag 10B is inflated with the child seat 6, instead of a passenger, placed on the passenger seat, the openable-closable vent hole 11 opens upon contact between the child seat 6 and the lower portion 10b of the airbag 10B in the inflated state, whereby the pressure inside the airbag 10B is reduced, preventing the lower portion 10b of the airbag 10B from pressing the child seat 6. This eliminates the necessity of configuring the airbag device so as not to inflate the airbag 10B. Therefore, the airbag device can be provided with a relatively low cost.

Also in this embodiment, the line segments connecting the seam 23, with which the corner 21 of the covering member 20B is sewed from the inside of the airbag on the side face 10m of the airbag 10B, the upper band 40, and the lower band 41 substantially form a triangle with the foregoing elements as vertexes. In addition, the entirety of the openable-closable vent hole 11 resides within the triangle.

Further, the covering member 20B has such a shape that the two sides thereof meeting at the corner 21 extend along a line segment connecting the upper end of the seam 23 and the upper band 40 and a line segment connecting the lower end of the seam 23 and the lower band 41, respectively. Specifically, the covering member 20B also has a plan-view shape substantially the same as the tension region defined on the covering member 20B when the upper end and the lower end of the side 22 are pulled by the upper tether 30B and the lower tether 31B, respectively.

Therefore, when the upper and lower ends of the side 22 of the covering member 20B are pulled by the upper tether 30B and the lower tether 31B, respectively, almost the entirety of the covering member 20B is under tension, with little or no portion thereof not being under tension. In addition, the entirety of the openable-closable vent hole 11 is covered with the covering member 20B.

Thus, also in this embodiment, the covering member 20B of the minimum size can sufficiently cover the openable-closable vent hole 11, whereby the material cost can be suppressed to a low level.

Figure 17:
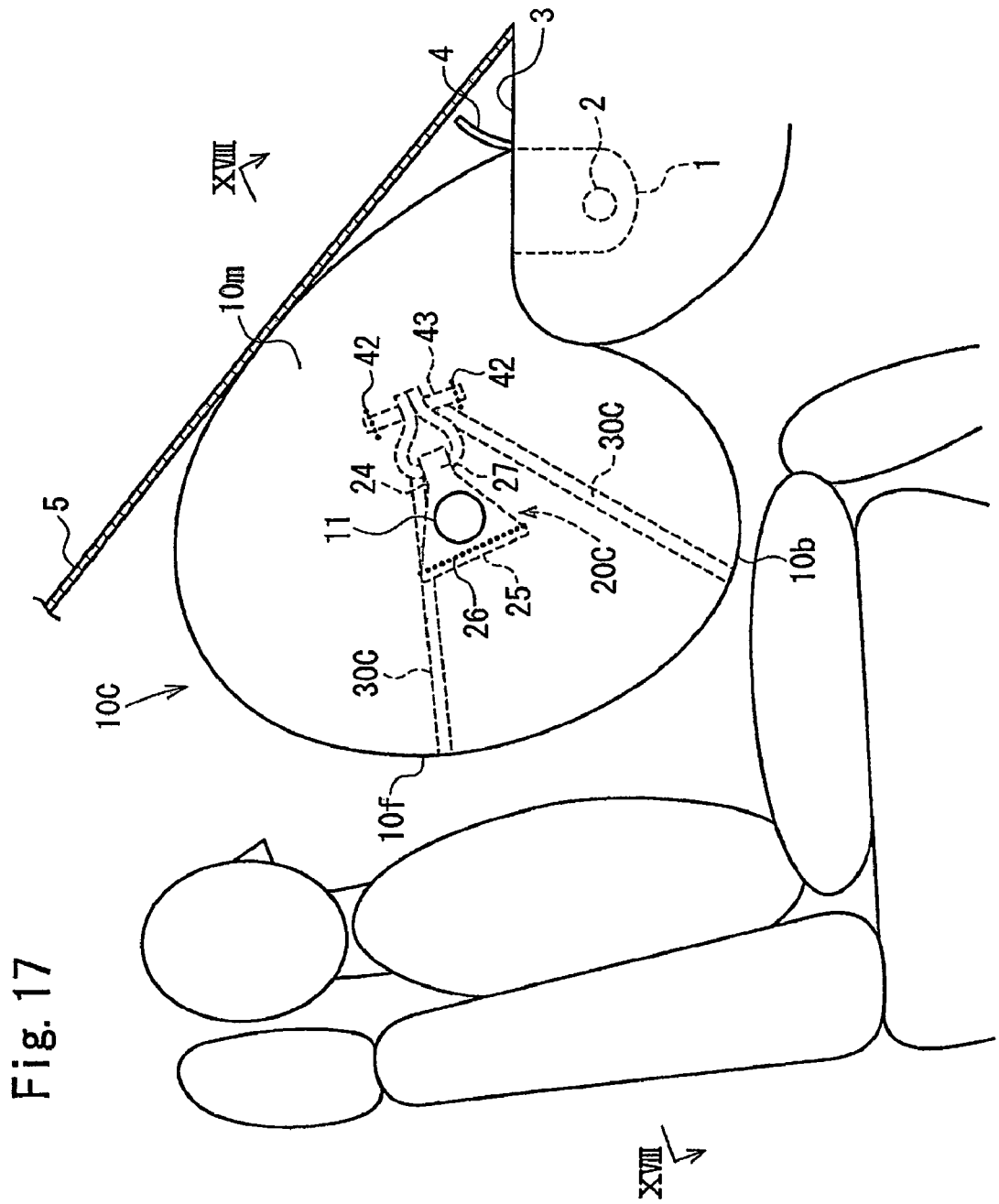
FIG. 17 is a side view of an airbag according to yet another embodiment in an inflated state.
Figure 18:
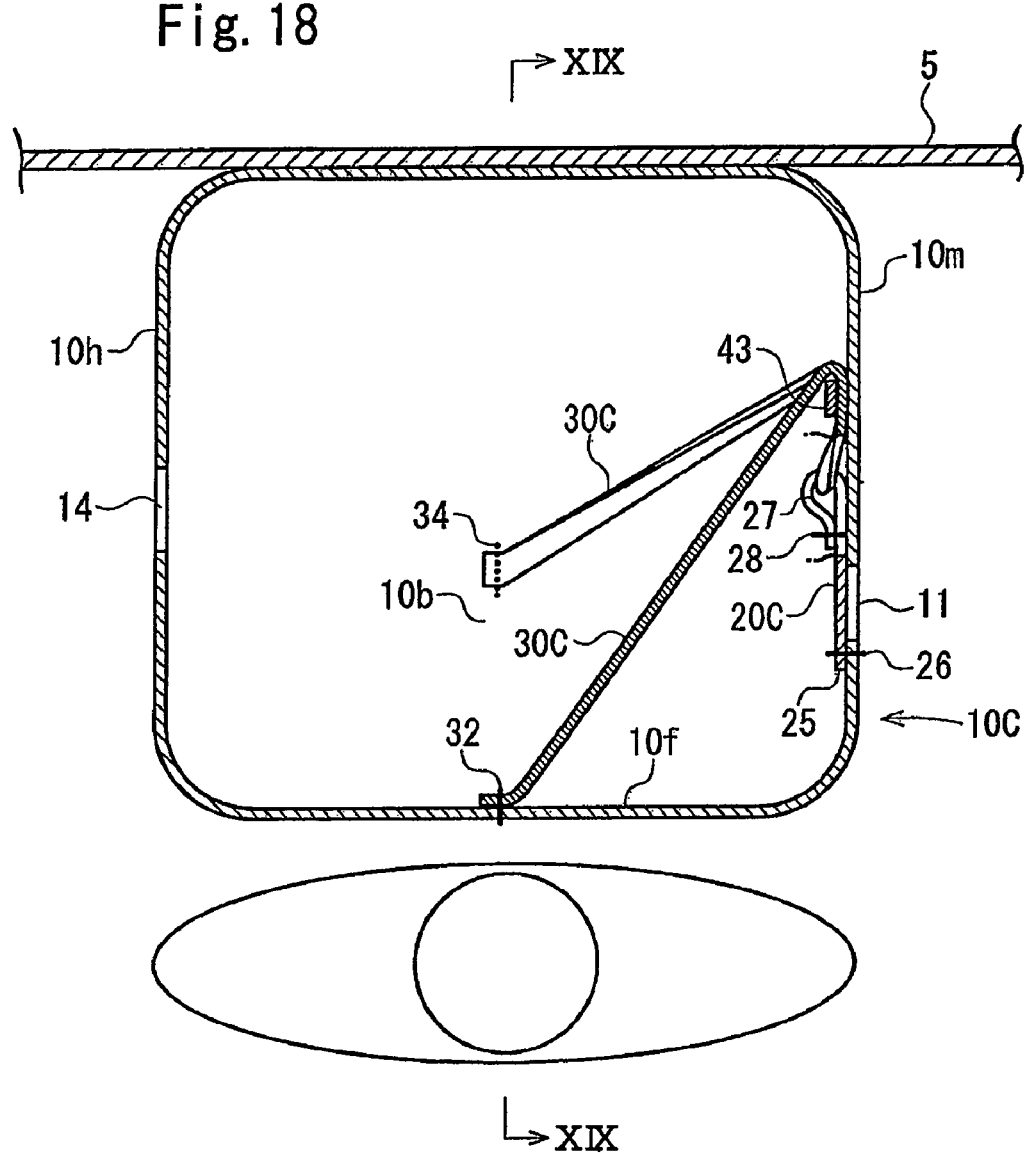
FIG. 18 is a cross-sectional view taken along the line XVIII-XVIII of FIG. 17.
Figure 19:
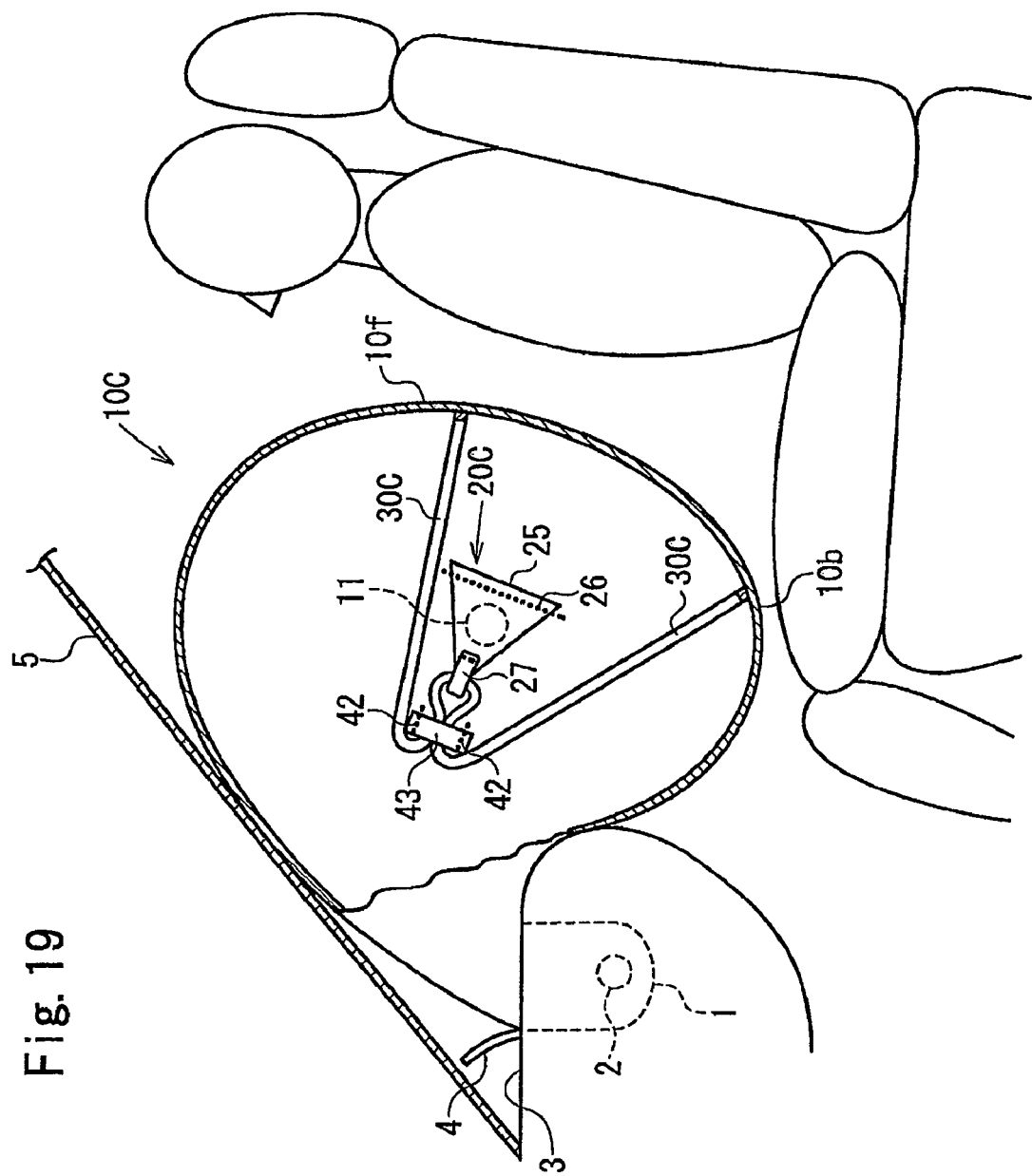
FIG. 19 is a cross-sectional view taken along the line XIX-XIX of FIG. 18.
Figure 20:
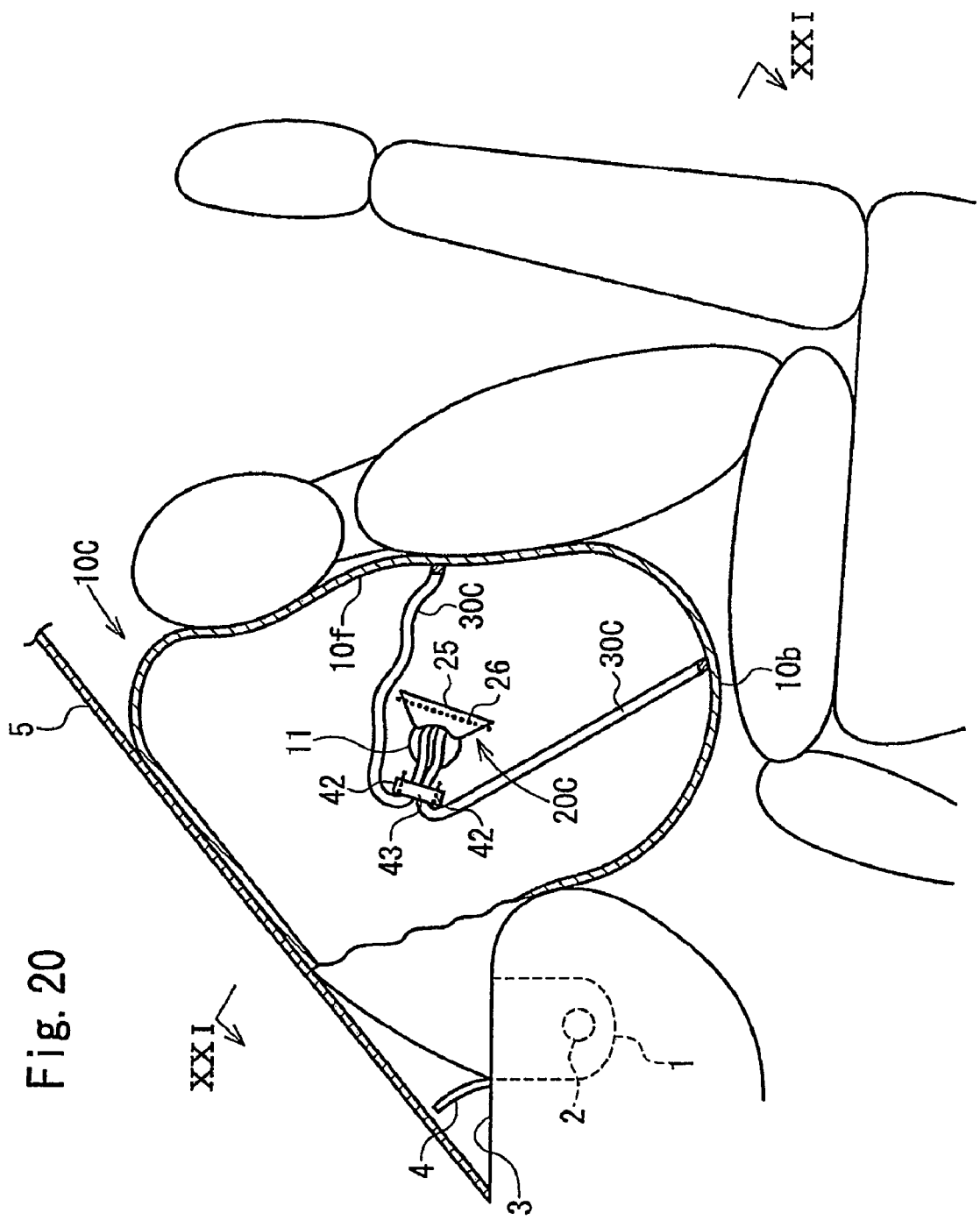
FIG. 20 is a cross-sectional view showing a state where an occupant is in contact with a near-occupant face of the airbag shown in FIG. 17.
Figure 21:
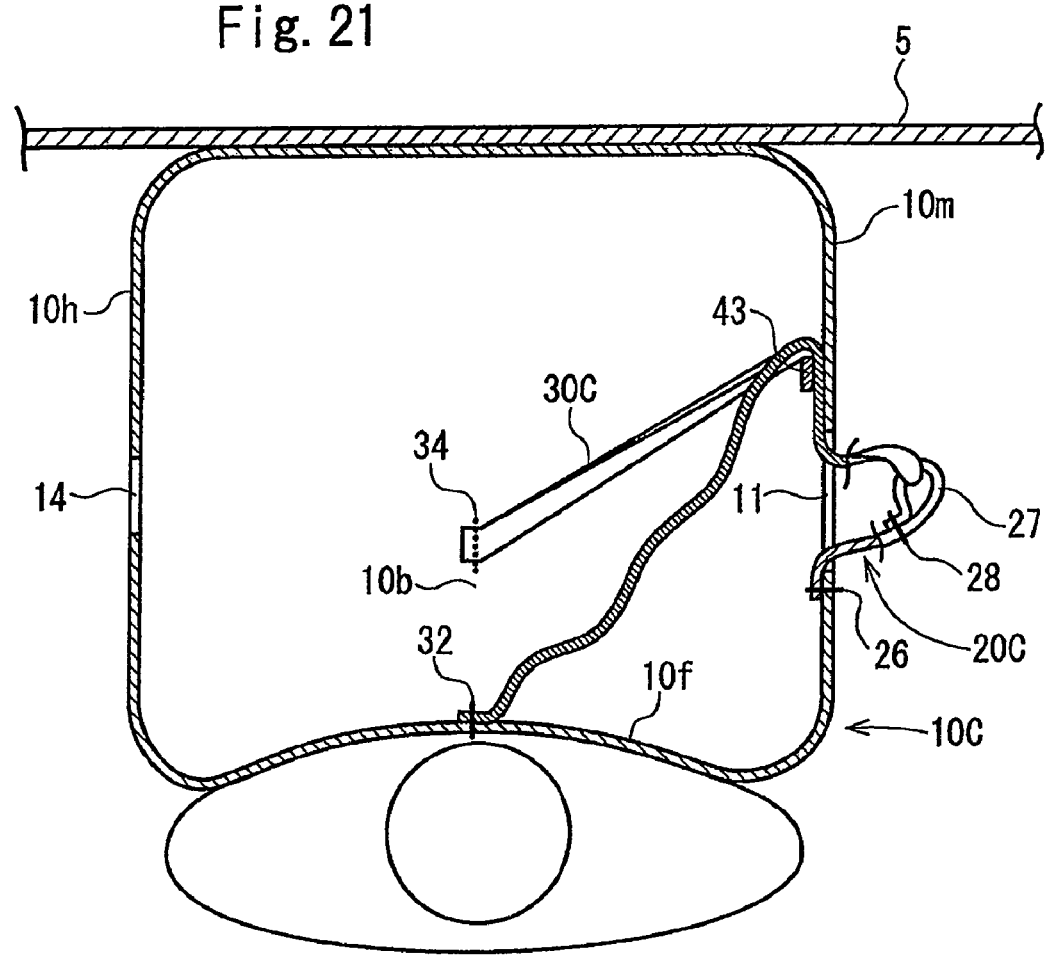
FIG. 21 is a cross-sectional view taken along the line XXI-XXI of FIG. 20.

FIG. 17 is a side view of an airbag according to yet another embodiment in an inflated state. FIG. 18 is a cross-sectional view taken along the line XVIII-XVIII of FIG. 17. FIG. 19 is a cross-sectional view taken along the line XIX-XIX of FIG. 18. FIG. 20 is a cross-sectional view showing a state where an occupant is in contact with a near-occupant face of the inflated airbag. FIG. 21 is a cross-sectional view taken along the line XXI-XXI of FIG. 20. FIG. 21 is a cross-sectional view showing a state where a child seat is in contact with a lower portion of the inflated airbag.

An airbag 10C of this embodiment is also an airbag for a passenger seat of a vehicle.

Also in this embodiment, the airbag 10C in the inflated state has on one side face 10m thereof an openable-closable vent hole 11, which is opened and closed by a covering member 20C.

In this embodiment, as in the case of the airbag 10B shown in FIGS. 11 to 16, the covering member 20C covers the openable-closable vent hole 11 from the inside of the airbag 10C.

As shown in FIG. 19, the covering member 20C is the same as the covering member 20A of the embodiment shown in FIGS. 6 to 10, except that the covering member 20C is provided inside the airbag 10C. Specifically, the covering member 20C is also a substantially triangular piece of woven fabric. The covering member 20C overlies the openable-closable vent hole 11 in such a position that a corner 24 of the triangle resides away from a near-passenger face 10f with respect to the openable-closable vent hole 11, and a side 25 opposite the corner 24 resides near the near-passenger face 10f with respect to the openable-closable vent hole 11. The covering member 20C is also sewed along the side 25 thereof on a side face 10m of the airbag 10C, i.e., on the inner surface of the airbag, with a seam 26.

Therefore, also in the airbag 10C, the covering member 20C has the side 25 thereof serving as a fixed end and the corner 24 thereof opposite the side 25 serving as a free end.

Also in this embodiment, the covering member 20C has at the corner 24 thereof a loop 27 through which a tether 30C, serving as a connecting member described below, is made to pass. Also in this embodiment, the loop 27 is constituted by a small piece of cloth having a shape of a tongue extending from the corner 24, the tip of the small piece of cloth being folded to meet the base thereof and sewed on the base with a seam 28.

Further, in this embodiment, the airbag 10C is provided on the inner surface of the side face 10m thereof, having the openable-closable vent hole 11, with a single band 43, through which the tether 30C is made to pass, at a position away from the near-passenger face 10f of the airbag 10C in the inflated state with respect to the openable-closable vent hole 11, the position not being covered with the covering member 20A. Also in this embodiment, the band 43 is a small piece of cloth having a substantially rectangular shape and is placed on the airbag's inner surface of the side face 10m, with the ends thereof in the longitudinal direction sewed on the side face 10m with seams 42.

As shown in FIG. 19, in a state where the covering member 20C is placed on the inner surface of the side face 10m of the airbag and covers the openable-closable vent hole 11, the band 43 is provided at a position farther away from the near-passenger face 10f with respect to the openable-closable vent hole 11, beyond the loop 27 provided at the corner 24 of the covering member 20C.

As in the case of the airbag 10A shown in FIGS. 6 to 10, in the airbag 10C, a single connecting member, i.e., the tether 30C, connects the near-passenger face 10f and the lower portion 10b of the airbag 10C in the inflated state and the corner 24 of the covering member 20C.

Specifically, as shown in FIG. 21, the tether 30C of this embodiment has one end thereof sewed from the inside of the airbag 10C on the near-passenger face 10f of the airbag 10C with a seam 32, the other end thereof sewed on the lower portion 10b of the airbag 10C with a seam 34, and a portion thereof halfway in the longitudinal direction routed through the band 43 from a side away, from the covering member 20C toward the covering member 20C and through the loop 27 at the corner 24 of the covering member 20C.

Also in this embodiment, the line segments connecting the band 43 and the upper end and the lower end of the seam 26, with which the side 25 of the covering member 20C is sewed on the inner surface of the side face 10m of the airbag, substantially form a triangle with the foregoing elements as vertexes. The entirety of the openable-closable vent hole 11 resides within the triangle.

Further, in this embodiment, the covering member 20C has such a shape that two sides thereof (whose reference numerals are omitted) meeting at the corner 24 extend along a line segment connecting the upper end of the seam 26 and the band 43 and a line segment connecting the lower end of the seam 26 and the band 43, respectively.

In the airbag 10C, no constantly open vent holes but the openable-closable vent hole 11 is provided on the side face 10m, and a constantly open vent hole 14 is provided only on a side face 10h opposite the side face 10m. However, another constantly open vent hole may also be provided on the side face 10m having the openable-closable vent hole 11.

The other configurations of the airbag 10C and an airbag device including the airbag 10C are the same as those in the above-described embodiment shown in FIGS. 6 to 10. In FIGS. 17 to 22, the same reference numerals are used to denote the same elements as those shown in FIGS. 6 to 10.

The airbag 10C, before inflated, is also folded in a state where the covering member 20C overlies the openable-closable vent hole 11 from the inside of the airbag 10C, and is housed in a container 1.

Also in a passenger airbag device including the airbag 10C, in the event of crashing of the vehicle or the like, an inflator 2 operates and gas is supplied from the inflator 2 to the airbag 10C, whereby the airbag 10C starts to be inflated. As shown in FIGS. 17 and 19, the airbag 10C pushes a lid 4 open and is deployed from the top surface of an instrument panel 3 toward a passenger.

In this case, as shown in FIGS. 18 and 19, while the near-passenger face 10f of the airbag 10C bulges toward the passenger, the one end of the tether 30C is pulled toward the passenger side. Further, while the lower portion 10b of the airbag 10C bulges downward, the other end of the tether 30C is pulled downward. This causes the tether 30C to be under tension between the near-passenger face 10f of the airbag 10C and the loop 27 of the covering member 20C, and between the loop 27 and the lower portion 10b of the airbag 10C, in series.

Therefore, the loop 27 of the covering member 20C is pulled by the tether 30C in a direction away from the side 25, i.e., the seam 26. Thus, the covering member 20C is under tension along the side face 10m of the airbag 10C, i.e., the inner surface of the airbag, and therefore overlies the openable-closable vent hole 11, whereby the openable-closable vent hole 11 closes.

Also in this embodiment, since the airbag 10C, before inflated, is folded with the covering member 20C overlying the openable-closable vent hole 11 from the inside of the airbag 10C, the covering member 20C overlies the openable-closable vent hole 11 from the start of inflation of the airbag 10C.

Consequently, while the airbag 10C is being inflated, the gas is regulated not to be discharged through the openable-closable vent hole 11 to the outside of the airbag 10C. Hence, the pressure inside the airbag 10C quickly increases, and the airbag 10C is quickly inflated and deployed.

In a case where a passenger is seated on the passenger seat, as shown in FIGS. 20 and 21, the passenger comes into contact with the near-passenger face 10f of the airbag 10C in the inflated state, and the near-passenger face 10f is pushed by the passenger and retracts inward of the airbag 10C. With the retracting of the near-passenger face 10f, the entirety of the tether 30C loosens. This loosening causes the covering member 20C to be pushed out of the airbag 10C from the corner 24 thereof because of the gas pressure inside the airbag 10C. Thus, the openable-closable vent hole 11 opens, and the gas is discharged through the openable-closable vent hole 11 and the constantly open vent hole 14 to the outside of the airbag 10C. Consequently, the passenger is softly received by the airbag 10C.

As shown in FIG. 22, in a case where the airbag 10C is inflated with a child seat 6 placed on the passenger seat, the child seat 6 comes into contact with the lower portion 10b of the airbag 10C in the inflated state, and the lower portion 10b of the airbag 10C is pushed by the child seat 6 and retracts inward of the airbag 10C. Also in this case, the entirety of the tether 30C loosens with the retracting of the lower portion 10b of the airbag 10C. This loosening causes the covering member 20C to be pushed out of the airbag 10C from the corner 24 thereof because of the gas pressure inside the airbag 10C. Thus, the openable-closable vent hole 11 opens, and the gas is discharged through the openable-closable vent hole 11 and the constantly open vent hole 14 to the outside of the airbag 10C. Consequently, the pressure inside the airbag 10C is reduced.

As described above, even if the airbag 10C is inflated with the child seat 6, instead of a passenger, placed on the passenger seat, the openable-closable vent hole 11 opens upon contact between the child seat 6 and the lower portion 10b of the airbag 10C in the inflated state, whereby the pressure inside the airbag 10C is reduced, preventing the lower portion 10b of the airbag 10C from pressing the child seat 6. This eliminates the necessity of configuring the airbag device so as not to inflate the airbag 10C. Therefore, the airbag device can be provided with a relatively low cost.

Also in this embodiment, the line segments connecting the band 43 and the upper end and the lower end of the seam 26, with which the side 25 of the covering member 20C is sewed on the side face 10m of the airbag 10C, substantially form a triangle with the foregoing elements as vertexes. In addition, the entirety of the openable-closable vent hole 11 resides within the triangle.

Further, the covering member 20C has such a shape that the two sides thereof meeting at the corner 24 extend along a line segment connecting the upper end of the seam 26 and the band 43 and a line segment connecting the lower end of the seam 26 and the band 43, respectively. Specifically, the covering member 20C has a plan-view shape substantially the same as the tension region defined on the covering member 20C when the corner 24 is pulled by the tether 30C. Therefore, when the corner 24 is pulled by the tether 30C, almost the entirety of the covering member 20C is under tension, with little or no portion thereof not being under tension. In addition, the entirety of the openable-closable vent hole 11 is covered with the covering member 20C.

Thus, also in this embodiment, the covering member 20C of the minimum size can sufficiently cover the openable-closable vent hole 11, whereby the material cost can be suppressed to a low level.

The embodiments described above are only examples of the present invention, and the present invention is not limited to these embodiments.

The embodiments concern a case where only one side face of the airbag is provided with an openable-closable vent hole that is covered with the covering member. Such an openable-closable vent hole may additionally be provided on the opposite side face of the airbag. Moreover, two or more openable-closable vent holes may be provided on each of the side faces of the airbag.

The embodiments concern an exemplary covering member having a substantially triangular shape. However, the covering member is not limited to have such a shape, and may have any other shape, such as a circular shape including an oval shape, a square shape, a trapezoidal shape, or a polygonal shape.

The embodiments concern a case where a single connecting member, i.e., a tether, is provided for each of the connection between the near-passenger face of the airbag and the covering member and the connection between the lower portion of the airbag and the covering member. Alternatively, two or more tethers may be provided for each of the foregoing connections.

In the present invention, the covering member and the tether, serving as a connecting member, may alternatively be connected with each other as an integral body.

In the present invention, the tether, serving as a connecting member, may be a string member, or a ribbon member made of cloth or the like. Of course, any member other than the tether may alternatively be used as a connecting member.

The embodiments concern a case where each vent hole is an opening having a substantially circular shape. However, the vent hole is not limited to have such a shape, and may have any other shape, for example, a slit-like shape.

The embodiments concern a case where sewing thread or the like forming seams are employed as means for connecting relevant members, including the covering member, the tethers, and the bands, to the airbag. In the present invention, such members may alternatively be connected to the airbag by any other connecting means, for example, bonding or welding.

In the present invention, a sash cord or the like may be provided inside the airbag such that the near-passenger face of the airbag and the face of the airbag opposite thereto are connected with the sash cord, whereby the extent to which the near-passenger face of the airbag, when inflated, bulges toward the passenger may be adjusted.

The embodiments described above are each an exemplary application of the present invention to an airbag and an airbag device for a passenger seat of a vehicle. The present invention may alternatively be applied to any other airbag and airbag device, for example, an airbag and an airbag device for a driver seat or a rear seat of a vehicle.

This application claims the benefit of Japanese Patent Application No. 2007-038072 filed on Feb. 19, 2007, which is hereby incorporated by reference herein in its entirety.

The invention claimed is:

1. An airbag comprising:
an openable-closable vent hole; and
a covering member that covers the openable-closable vent hole,
wherein the openable-closable vent hole is provided in a face of the airbag in an inflated state opposite a near-occupant face thereof or in a side face of the airbag,
wherein a connecting member is routed in the inside of the airbag, the connecting member connecting the near-occupant face of the airbag in the inflated state and the covering member and connecting a lower portion of the airbag in the inflated state and the covering member,
wherein, when the airbag is inflated, the covering member is prevented by the connecting member from moving toward the outside of the airbag and overlies the openable-closable vent hole, whereby the openable-closable vent hole closes or slightly opens,
wherein, in both cases where an occupant comes into contact with the near-occupant face of the inflated airbag and causes the near-occupant face to retract inward of the airbag, and where an object comes into contact with the lower portion of the airbag and causes the lower portion to retract inward of the airbag, the connecting member loosens and the covering member moves away from the openable-closable vent hole because of gas pressure inside the airbag, whereby the openable-closable vent hole opens or significantly opens,
wherein the covering member covers the openable-closable vent hole from the outside of the airbag,
wherein the covering member has at least one fixed end thereof connected to the airbag, and a free end thereof not connected to the airbag,
wherein the airbag is provided with first and second constantly open vent holes in respective regions that are near the free end of the covering member and are not covered with the covering member, the regions being at different positions along the periphery of the openable-closable vent hole,
wherein the connecting member includes
an upper connecting member that is routed through the first constantly open vent hole and in the inside of the airbag and connects the free end of the covering member and the near-occupant face of the airbag; and
a lower connecting member that is routed through the second constantly open vent hole and in the inside of the airbag and connects the free end of the covering member and the lower portion of the airbag,
wherein the upper connecting member is connected to a portion of the free end of the covering member, the portion being near the first constantly open vent hole,
wherein the lower connecting member is connected to another portion of the free end of the covering member, the portion being near the second constantly open vent hole,
wherein, when the airbag is inflated, the upper connecting member and the lower connecting member pull the free end of the covering member in a direction away from the fixed end, causing the covering member to be under tension along the outer surface of the airbag and to overlie the openable-closable vent hole, whereby the openable-closable vent hole closes or slightly opens,
wherein, if the occupant comes into contact with the near-occupant face of the inflated airbag and causes the near-occupant face to retract inward of the airbag, the upper connecting member loosens and the portion of the free end of the covering member near the first constantly open vent hole is turned up toward the outside of the airbag because of the gas pressure inside the airbag, whereby the openable-closable vent hole opens or significantly opens, and
wherein, if the object comes into contact with the lower portion of the inflated airbag and causes the lower portion to retract inward of the airbag, the lower connecting member loosens and the portion of the free end of the covering member near the second constantly open vent hole is turned up toward the outside of the airbag because of the gas pressure inside the airbag, whereby the openable-closable vent hole opens or significantly opens.

2. The airbag according to claim 1, wherein line segments connecting the fixed end of the covering member, the first constantly open vent hole, and the second constantly open vent hole substantially form a triangle with the foregoing elements as vertexes, the openable-closable vent hole residing within the triangle.

3. An airbag comprising:
an openable-closable vent hole; and
a covering member that covers the openable-closable vent hole,
wherein the openable-closable vent hole is provided in a face of the airbag in an inflated state opposite a near-occupant face thereof or in a side face of the airbag,
wherein a connecting member is routed in the inside of the airbag, the connecting member connecting the near-occupant face of the airbag in the inflated state and the covering member and connecting a lower portion of the airbag in the inflated state and the covering member,
wherein, when the airbag is inflated, the covering member is prevented by the connecting member from moving toward the outside of the airbag and overlies the openable-closable vent hole, whereby the openable-closable vent hole closes or slightly opens,
wherein, in both cases where an occupant comes into contact with the near-occupant face of the inflated airbag and causes the near-occupant face to retract inward of the airbag, and where an object comes into contact with the lower portion of the airbag and causes the lower portion to retract inward of the airbag, the connecting member loosens and the covering member moves away from the openable-closable vent hole because of gas pressure inside the airbag, whereby the openable-closable vent hole opens or significantly opens,
wherein the covering member covers the openable-closable vent hole from the outside of the airbag,
wherein the covering member has at least one fixed end thereof connected to the airbag, and a free end thereof not connected to the airbag,
wherein a loop through which the connecting member is made to pass is provided at the free end of the covering member,
wherein the airbag is provided with a constantly open vent hole in a region that is near the free end of the covering member and is not covered with the covering member,
wherein the connecting member has both ends thereof connected from the inside of the airbag to the near-occupant face of the airbag and to the lower portion of the airbag, respectively, and a portion thereof halfway in the longitudinal direction routed through the constantly open vent hole to the outside of the airbag and through the loop,
wherein, when the airbag is inflated, the connecting member pulls the free end of the covering member in a direction away from the fixed end, causing the covering member to be under tension along the outer surface of the airbag and to overlie the openable-closable vent hole, whereby the openable-closable vent hole closes or slightly opens, and
wherein, in both cases where the occupant comes into contact with the near-occupant face of the inflated airbag and causes the near-occupant face to retract inward of the airbag, and where the object comes into contact with the lower portion of the airbag and causes the lower portion to retract inward of the airbag, the entirety of the connecting member loosens and the free end of the covering member is turned up toward the outside of the airbag because of the gas pressure inside the airbag, whereby the openable-closable vent hole opens or significantly opens.

4. The airbag according to claim 3,
wherein the fixed end of the covering member is connected to the airbag with a linear connected portion extending in a direction intersecting a direction connecting the fixed end and the free end of the covering member, and
wherein line segments connecting both ends of the linear connected portion and the constantly open vent hole substantially form a triangle with the foregoing elements as vertexes, the openable-closable vent hole residing within the triangle.

5. An airbag comprising:
an openable-closable vent hole; and
a covering member that covers the openable-closable vent hole,
wherein the openable-closable vent hole is provided in a face of the airbag in an inflated state opposite a near-occupant face thereof or in a side face of the airbag,
wherein a connecting member is routed in the inside of the airbag, the connecting member connecting the near-occupant face of the airbag in the inflated state and the covering member and connecting a lower portion of the airbag in the inflated state and the covering member,
wherein, when the airbag is inflated, the covering member is prevented by the connecting member from moving toward the outside of the airbag and overlies the openable-closable vent hole, whereby the openable-closable vent hole closes or slightly opens,
wherein, in both cases where an occupant comes into contact with the near-occupant face of the inflated airbag and causes the near-occupant face to retract inward of the airbag, and where an object comes into contact with the lower portion of the airbag and causes the lower portion to retract inward of the airbag, the connecting member loosens and the covering member moves away from the openable-closable vent hole because of gas pressure inside the airbag, whereby the openable-closable vent hole opens or significantly opens,
wherein the covering member covers the openable-closable vent hole from the inside of the airbag,
wherein the covering member has at least one fixed end thereof connected to the airbag, and a free end thereof not connected to the airbag,
wherein the connecting member includes
  an upper connecting member that is routed in the inside of the airbag and connects the free end of the covering member and the near-occupant face of the airbag; and
  a lower connecting member that is routed in the inside of the airbag and connects the free end of the covering member and the lower portion of the airbag,
wherein the airbag is provided with a first band and a second band through which the upper connecting member and the lower connecting member are made to pass, respectively, in respective regions that are near the free end of the covering member and are not covered with the covering member,
wherein the first band and the second band are provided at different positions along the periphery of the openable-closable vent hole, wherein the upper connecting member is connected to a portion of the free end of the covering member, the portion being near the first band, wherein the lower connecting member is connected to another portion of the free end of the covering member, the portion being near the second band, wherein, when the airbag is inflated, the upper connecting member and the lower connecting member pull the free end of the covering member in a direction away from the fixed end, causing the covering member to be under tension along the inner surface of the airbag and to overlie the openable-closable vent hole, whereby the openable-closable vent hole closes or slightly opens, wherein, if the occupant comes into contact with the near-occupant face of the inflated airbag and causes the near-occupant face to retract inward of the airbag, the upper connecting member loosens and the portion of the free end of the covering member near the first band is pushed out through the openable-closable vent hole toward the outside of the airbag because of the gas pressure inside the airbag, whereby the openable-closable vent hole opens or significantly opens, and wherein, if the object comes into contact with the lower portion of the inflated airbag and causes the lower portion to retract inward of the airbag, the lower connecting member loosens and the portion of the free end of the covering member near the second band is pushed out through the openable-closable vent hole toward the outside of the airbag because of the gas pressure inside the airbag, whereby the openable-closable vent hole opens or significantly opens.

6. The airbag according to claim 5, wherein line segments connecting the fixed end of the covering member, the first band, and the second band substantially form a triangle with the foregoing elements as vertexes, the openable-closable vent hole residing within the triangle.

7. An airbag comprising:
an openable-closable vent hole; and
a covering member that covers the openable-closable vent hole,
wherein the openable-closable vent hole is provided in a face of the airbag in an inflated state opposite a near-occupant face thereof or in a side face of the airbag,
wherein a connecting member is routed in the inside of the airbag, the connecting member connecting the near-occupant face of the airbag in the inflated state and the covering member and connecting a lower portion of the airbag in the inflated state and the covering member,
wherein, when the airbag is inflated, the covering member is prevented by the connecting member from moving toward the outside of the airbag and overlies the openable-closable vent hole, whereby the openable-closable vent hole closes or slightly opens,
wherein, in both cases where an occupant comes into contact with the near-occupant face of the inflated airbag and causes the near-occupant face to retract inward of the airbag, and where an object comes into contact with the lower portion of the airbag and causes the lower portion to retract inward of the airbag, the connecting member loosens and the covering member moves away from the openable-closable vent hole because of gas pressure inside the airbag, whereby the openable-closable vent hole opens or significantly opens,
wherein the covering member covers the openable-closable vent hole from the inside of the airbag,
wherein the covering member has at least one fixed end thereof connected to the airbag, and a free end thereof not connected to the airbag,
wherein a loop through which the connecting member is made to pass is provided at the free end of the covering member,
wherein the airbag is provided with a band through which the connecting member is made to pass, in a region that is near the free end of the covering member and is not covered with the covering member,
wherein the connecting member has both ends thereof connected from the inside of the airbag to the near-occupant face of the airbag and to the lower portion of the airbag, respectively, a portion thereof halfway in the longitudinal direction routed through the loop of the covering member, and other portions thereof between the portion routed through the loop and both ends routed through the band,
wherein, when the airbag is inflated, the connecting member pulls the free end of the covering member in a direction away from the fixed end, causing the covering member to be under tension along the inner surface of the airbag and to overlie the openable-closable vent hole, whereby the openable-closable vent hole closes or slightly opens, and
wherein, in both cases where the occupant comes into contact with the near-occupant face of the inflated airbag and causes the near-occupant face to retract inward of the airbag, and where the object comes into contact with the lower portion of the airbag and causes the lower portion to retract inward of the airbag, the entirety of the connecting member loosens and the free end of the covering member is pushed out through the openable-closable vent hole toward the outside of the airbag because of the gas pressure inside the airbag, whereby the openable-closable vent hole opens or significantly opens.

8. The airbag according to claim 7,
wherein the fixed end of the covering member is connected to the airbag with a linear connected portion extending in a direction intersecting a direction connecting the fixed end and the free end of the covering member, and
wherein line segments connecting both ends of the linear connected portion and the constantly open vent hole substantially form a triangle with the foregoing elements as vertexes, the openable-closable vent hole residing within the triangle.

* * * * *